United States Patent
Shamroukh et al.

(10) Patent No.: US 6,877,291 B2
(45) Date of Patent: Apr. 12, 2005

(54) STRAP HOLDING DEVICE

(75) Inventors: Louay A. Shamroukh, Discovery Bay, CA (US); Mark G. Crawford, Visalia, CA (US)

(73) Assignee: Simpson Strong-Tie Company, Inc., Dublin, CA (US)

( * ) Notice: Subject to any disclaimer, the term of this patent is extended or adjusted under 35 U.S.C. 154(b) by 94 days.

(21) Appl. No.: 10/279,309

(22) Filed: Oct. 23, 2002

(65) Prior Publication Data
US 2003/0136059 A1 Jul. 24, 2003

Related U.S. Application Data

(63) Continuation-in-part of application No. 10/000,678, filed on Oct. 30, 2001.

(51) Int. Cl.[7] .............................. E04B 1/38; B25G 3/00
(52) U.S. Cl. ............................ 52/702; 52/704; 52/708; 52/715; 403/232.1
(58) Field of Search ......................... 52/702, 704, 708, 52/715; 403/232.1

(56) References Cited

U.S. PATENT DOCUMENTS

| | | |
|---|---|---|
| 651,139 A | 6/1900 | Gays |
| 688,230 A | 12/1901 | Isgrig |
| 1,106,845 A | 8/1914 | Ream |
| 1,204,956 A | 11/1916 | Day |
| 1,214,738 A | 2/1917 | Wolf |
| 1,378,448 A | 5/1921 | Gilbert |
| 1,458,498 A | 6/1923 | Piel |
| 1,461,704 A | 7/1923 | Bonsall |
| 1,514,577 A | 11/1924 | Burrell |
| 1,523,970 A | 1/1925 | Jakob |
| 1,533,041 A | 4/1925 | Slater |
| 1,558,239 A | 10/1925 | Costello |
| 1,614,334 A | 1/1927 | Wright |
| 1,656,741 A | 1/1928 | Lane |
| 1,685,729 A | 9/1928 | Stone |
| 1,880,480 A | 10/1932 | Ragsdale |
| 2,037,736 A | 4/1936 | Payne |
| 2,042,370 A | 5/1936 | Walker |
| 2,116,263 A | 5/1938 | Harbaugh |
| 2,302,101 A | 11/1942 | Boydstun |
| 2,338,435 A | 1/1944 | Hoyt |

(Continued)

FOREIGN PATENT DOCUMENTS

| | | | |
|---|---|---|---|
| AU | 484192 | 6/1997 | |
| CA | 502492 | 5/1954 | |
| DE | 298 .19 351.5 | 3/1999 | |
| EP | 1 213 399 A2 | 6/2002 | |
| GB | 2 039 582 | 8/1980 | |
| GB | 2163788 A * | 3/1986 | ............ E04C/5/18 |
| GB | 2228955 A * | 9/1990 | ............ E04B/1/56 |
| WO | WO 96/29180 | 9/1996 | |

OTHER PUBLICATIONS

"The Stabilizer™ Truss Brace." Product Information. Mitek Industries, Inc., Chesterfield, MO 2001. Retrieved from the internet: URL http://www.mitek-us.com/mitekproducts/stabilizer.asp.

(Continued)

*Primary Examiner*—Peter M. Cuomo
*Assistant Examiner*—Sarah C. Burnham
(74) *Attorney, Agent, or Firm*—James R. Cypher; Charles R. Cypher

(57) ABSTRACT

A connection in which an elongated strap or a connector having an elongated strap member is secured by a strap holder. Such straps and connectors are used in a variety of building applications, typically in connections that resist tension forces parallel to the main axes of the straps or strap members. A number of connectors with elongated strap members are in common use with a variety of structural members.

24 Claims, 25 Drawing Sheets

U.S. PATENT DOCUMENTS

| | | | |
|---|---|---|---|
| 2,567,586 | A | 9/1951 | Werder |
| 2,619,887 | A | 12/1952 | Burrows |
| 2,686,959 | A | 8/1954 | Robinson |
| 2,806,495 | A | 9/1957 | Merkle et al. |
| 2,856,646 | A | 10/1958 | Latimer et al. |
| 2,947,119 | A | 8/1960 | Puckett, Jr. |
| 2,963,127 | A | 12/1960 | Manville |
| 2,964,807 | A | 12/1960 | Kennedy |
| 3,000,145 | A * | 9/1961 | Fine .......................... 52/699 |
| 3,010,162 | A | 11/1961 | Klein |
| 3,011,229 | A | 12/1961 | Mutchnik |
| 3,152,671 | A | 10/1964 | Mallory, Jr. |
| 3,201,874 | A | 8/1965 | Christy |
| 3,332,196 | A | 7/1967 | Tuttle |
| 3,335,993 | A | 8/1967 | Tuttle |
| 3,389,885 | A | 6/1968 | Friedman et al. |
| 3,422,585 | A * | 1/1969 | Dismukes ................. 52/127.3 |
| 3,467,418 | A | 9/1969 | Redditt |
| 3,591,997 | A | 7/1971 | Tennison et al. |
| 3,875,719 | A | 4/1975 | Menge |
| 3,959,945 | A | 6/1976 | Allen |
| 3,988,872 | A | 11/1976 | Adamson et al. |
| 4,016,698 | A | 4/1977 | Rogers |
| 4,040,232 | A | 8/1977 | Snow et al. |
| 4,171,172 | A | 10/1979 | Johnston |
| 4,234,174 | A | 11/1980 | Cardono |
| 4,237,614 | A | 12/1980 | Williams |
| 4,246,736 | A | 1/1981 | Kovar et al. |
| 4,253,224 | A | 3/1981 | Hickman et al. |
| 4,253,649 | A | 3/1981 | Hewson |
| 4,322,064 | A | 3/1982 | Jarvis |
| 4,339,903 | A | 7/1982 | Menge |
| 4,342,177 | A | 8/1982 | Smith |
| 4,350,279 | A | 9/1982 | Haley |
| 4,361,999 | A | 12/1982 | Sidney |
| 4,370,843 | A | 2/1983 | Menge |
| 4,420,921 | A | 12/1983 | Hardin |
| 4,422,792 | A * | 12/1983 | Gilb ....................... 403/232.1 |
| 4,490,956 | A | 1/1985 | Palacio et al. |
| 4,503,652 | A | 3/1985 | Turner |
| 4,524,554 | A | 6/1985 | Simpson |
| 4,563,851 | A | 1/1986 | Long |
| 4,570,407 | A | 2/1986 | Palacio et al. |
| 4,604,845 | A | 8/1986 | Brinker |
| 4,625,415 | A | 12/1986 | Diamontis |
| 4,637,195 | A | 1/1987 | Davis |
| 4,669,235 | A | 6/1987 | Reinen |
| 4,704,829 | A | 11/1987 | Baumker, Jr. |
| D293,416 | S | 12/1987 | Krueger |
| 4,712,340 | A | 12/1987 | Sogge |
| 4,843,726 | A | 7/1989 | Ward |
| 4,928,867 | A | 5/1990 | Jensen |
| 4,958,814 | A | 9/1990 | Johnson |
| 5,031,886 | A | 7/1991 | Sosebee |
| D318,785 | S | 8/1991 | Dean |
| 5,129,153 | A | 7/1992 | Burns, Sr. |
| 5,161,345 | A | 11/1992 | Sobjack, Sr. |
| 5,315,803 | A | 5/1994 | Turner |
| 5,324,132 | A * | 6/1994 | Hunter et al. ............ 403/232.1 |
| 5,367,853 | A * | 11/1994 | Bryan ......................... 52/702 |
| 5,388,378 | A | 2/1995 | Frye |
| 5,407,182 | A | 4/1995 | Hartley |
| 5,412,920 | A | 5/1995 | Hess |
| 5,490,334 | A | 2/1996 | Payne |
| 5,502,942 | A | 4/1996 | Gras et al. |
| 5,555,694 | A | 9/1996 | Commins |
| 5,606,837 | A | 3/1997 | Holizlander |
| 5,628,119 | A | 5/1997 | Bingham et al. |
| 5,638,655 | A | 6/1997 | Keck |
| 5,699,639 | A | 12/1997 | Fernandez |
| 5,884,411 | A | 3/1999 | Raber |
| 5,884,448 | A | 3/1999 | Pellock |
| 5,899,042 | A | 5/1999 | Pellock |
| 5,937,531 | A | 8/1999 | Menk et al. |
| 5,937,608 | A | 8/1999 | Kucirka |
| 5,992,122 | A | 11/1999 | Rohrmoser et al. |
| 6,070,336 | A | 6/2000 | Rodgers |
| 6,155,019 | A | 12/2000 | Ashton et al. |
| 6,170,218 | B1 | 1/2001 | Shahnazarian |
| 6,185,898 | B1 | 2/2001 | Pratt |
| 6,230,466 | B1 * | 5/2001 | Pryor .......................... 52/702 |
| 6,230,467 | B1 * | 5/2001 | Leek ........................... 52/702 |
| 6,463,711 | B1 * | 10/2002 | Callies ........................ 52/702 |
| 6,523,321 | B1 * | 2/2003 | Leek et al. ................... 52/702 |
| 6,546,678 | B1 | 4/2003 | Ashton et al. |

OTHER PUBLICATIONS

National Evaluation Report, Report No. NER–561. Mitek Stabilizer. National Evaluation Service, Inc., Falls Church, VA. Jul. 2000.

"Truss Products." Tee–Lok Wood Connectors product catalog, p. 10. Tee–Lok Corporation. 1995.

"Truslok Spacing Tools for Fast, Safe Truss Installation." Advertisement. Journal of Light Construction. Sep. 1999.

"Don't Just Space it, Brace–It.™ The Faster, Stronger, Easier Way to Brace Your Trusses." Product brochure. Truswal Systems Corporation, Arlington, TX. publication date unknown.

Guertin, M. "Adjustable Truss Braces." Journal of Light Construction. Mar. 1999, p. 10.

Arnold, R. and Guertin, M., "Installing Gable Roof Trusses." Journal of Light Construction. Dec. 1998, pp. 37–42.

"Truslock Spacing Tools. Space & Brace Trusses Simply by Folding Over." Product brochure . Truslock, Inc. publication date unknown.

Kant–sag TSX Truss Spacer. Product brochure. United Steel Products Company. Montgomery, MN. publication date unknown.

"Commentary and Recommendations for Handling, Installing and Bracing Metal Plate Connected Wood Trusses, HIB–91." Truss Plate Institute, Madison, WI. 1991.

META/HETA/HHETA/HETAL/TSS Embedded Truss Anchors and Truss Seat Snap–In. Simpson Strong–Tie Wood Connectors Catalog, p. 108. Simpson Strong–Tie Company, Inc., 1999.

Technical Bulletin. Coil Strap Alternative Nailing Schedule and Lap Splice Specifications. Simpson Strong–Tie Company, Inc., Dublin, CA. 2001.

"Hulbånd, vindtrækbånd, båndstrammer, båndspænder." BMF Handvaerkerkatalog 1989, Section 4, pp. 4.00.0–4.11.1. BMF Bygningsbeslag A/S. Odder Denmark. 1989.

"Lochbänder," "Lochblechstreifen," "Spanngerät" and "Spannger ät Typ 60." BMF product brochure, pp. 5, 8. BMF Baubeschläge GmbH & Co. KG. Denmark 1990.

"BMF Vindafstivningsstem 25." Product brochure. BMF Bygningsbeslag A/S. Odder, Denmark 2000.

"BMF Vindafstivningssystem 40/60." Product brochure. BMF Bygningsbeslag A/S. Odder, Denmark 2000.

"BMF Vindafstivningssystem." BMF Vindafstivningssystem product catalog. BMF Bygningsbeslag A/S. Odder, Denmark 2000.

Schoening, Carl. Declaration regarding wood frame demonstration structure. Executed Feb. 18, 2004.

"Zone Four Seismic Solutions." Zone Four. San Leandro, CA. Jan. 20, 1997.

"BMF Windaussteifungssysteme 2002" Product brochure. BMF–Simpson GmBH. Syke, Germany. Oct. 2001.

"BMF–Windrispenbänder," "BMF–Lochbänder," "BMF-Windverbandanschlüsse 1 und 2," and "BMF Windaussteifungssystem 40/60," BMF–Simpson Bausysteme für Holz. Statische Werte. pp. 39–44. BMF–Simpson GmBH. Syke, Germany 2002.

* cited by examiner

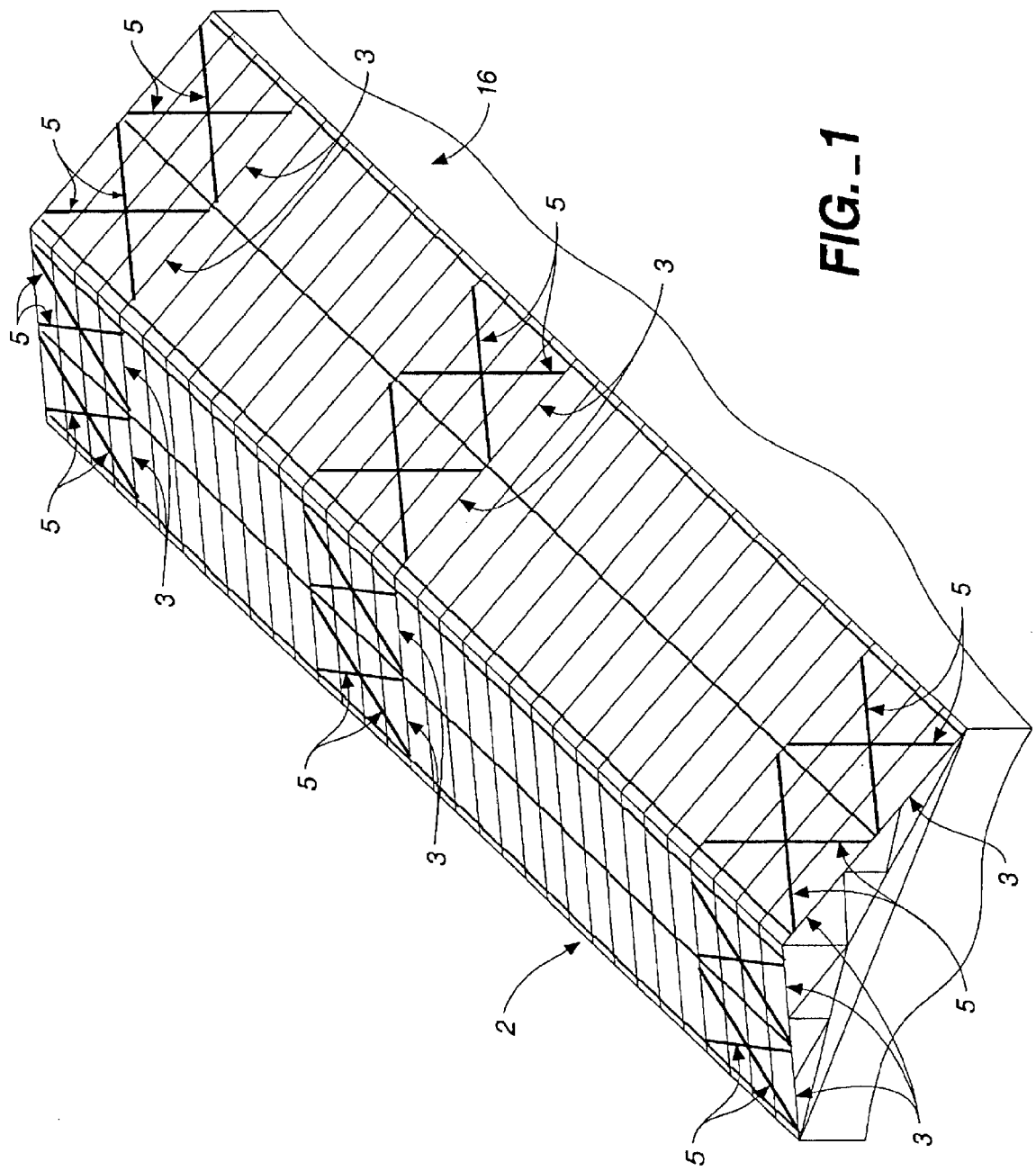
FIG._1

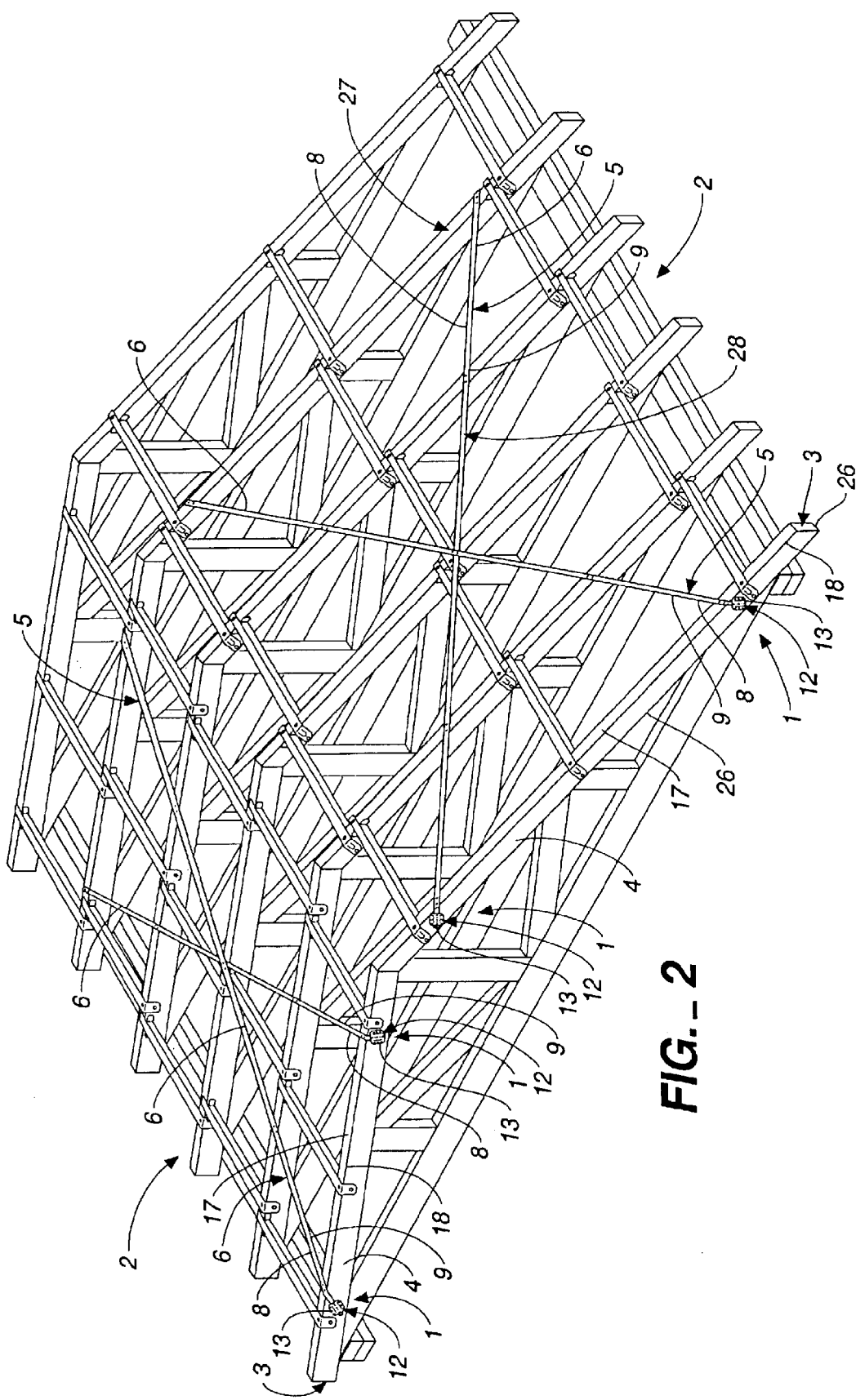
FIG._2

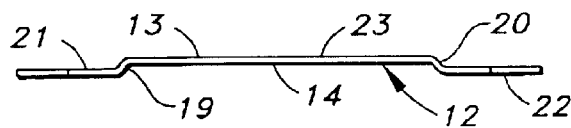
FIG._3
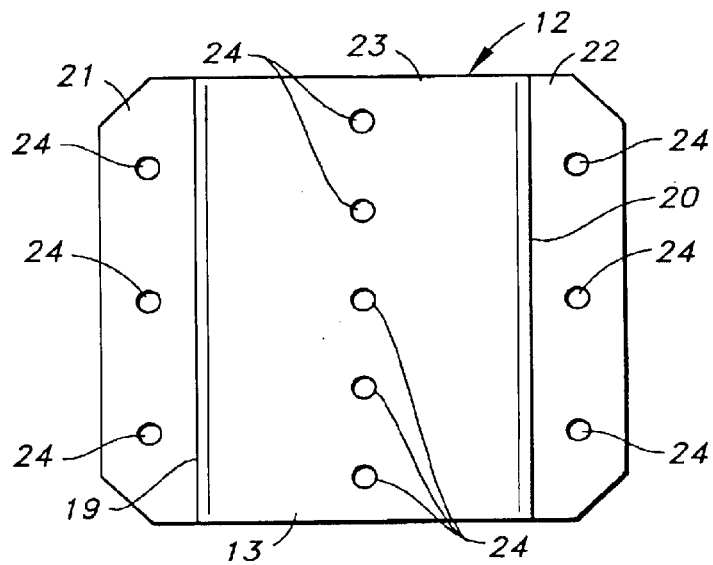
FIG._4
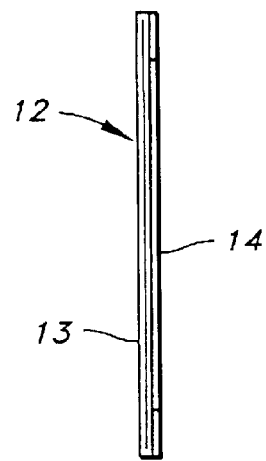
FIG._5
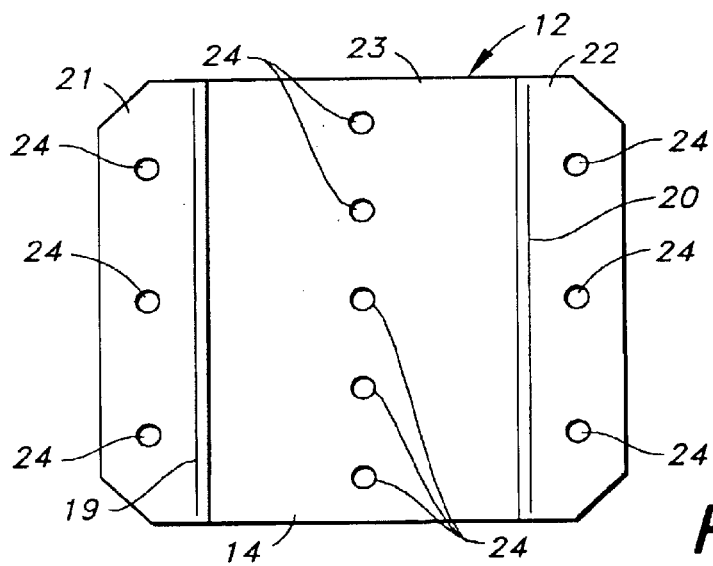
FIG._6

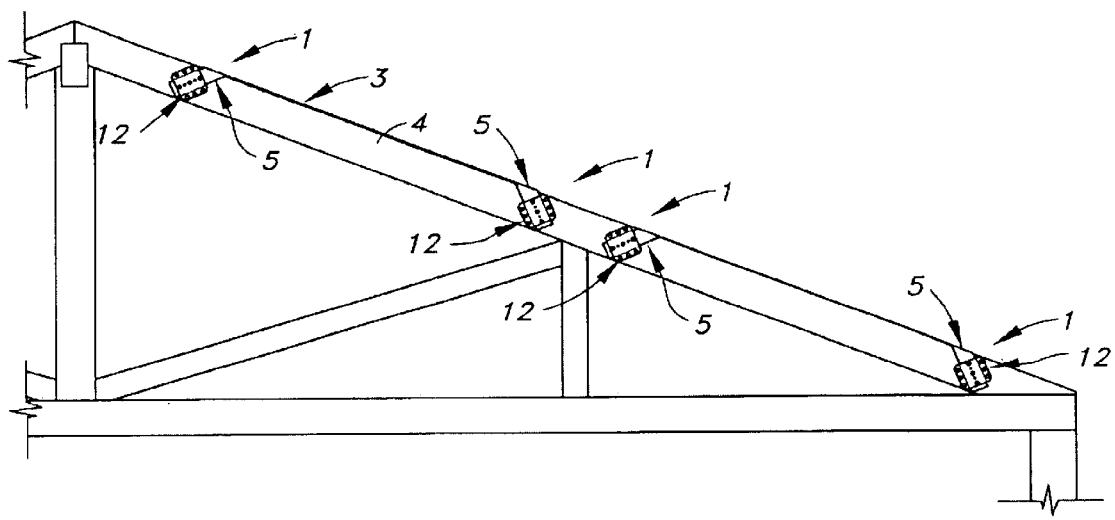
FIG._7
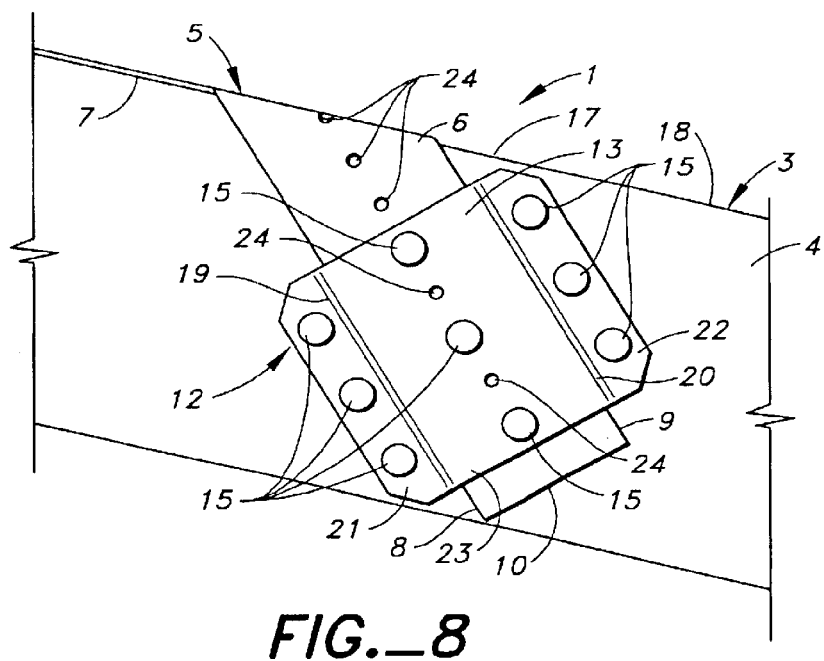
FIG._8

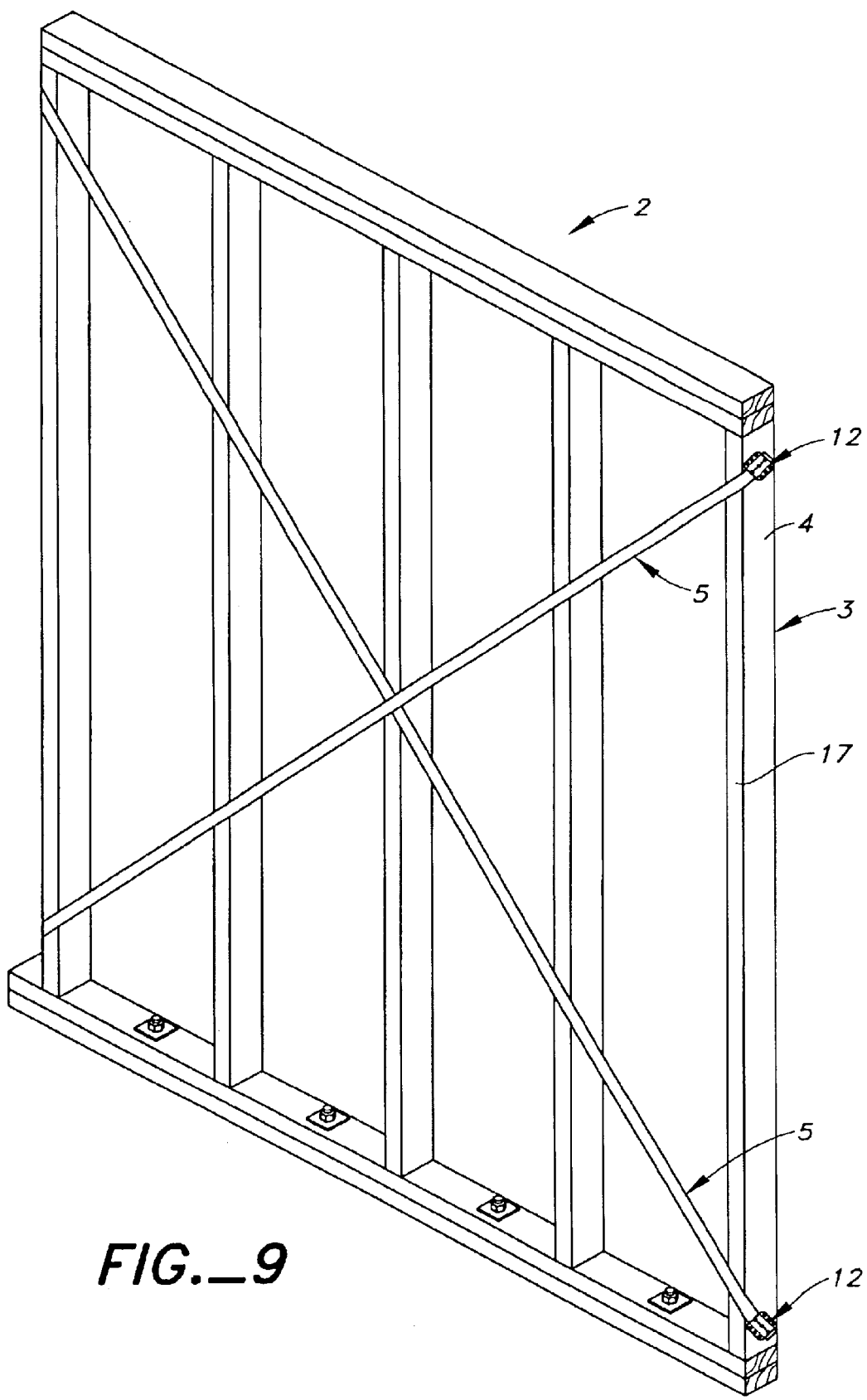
FIG._9

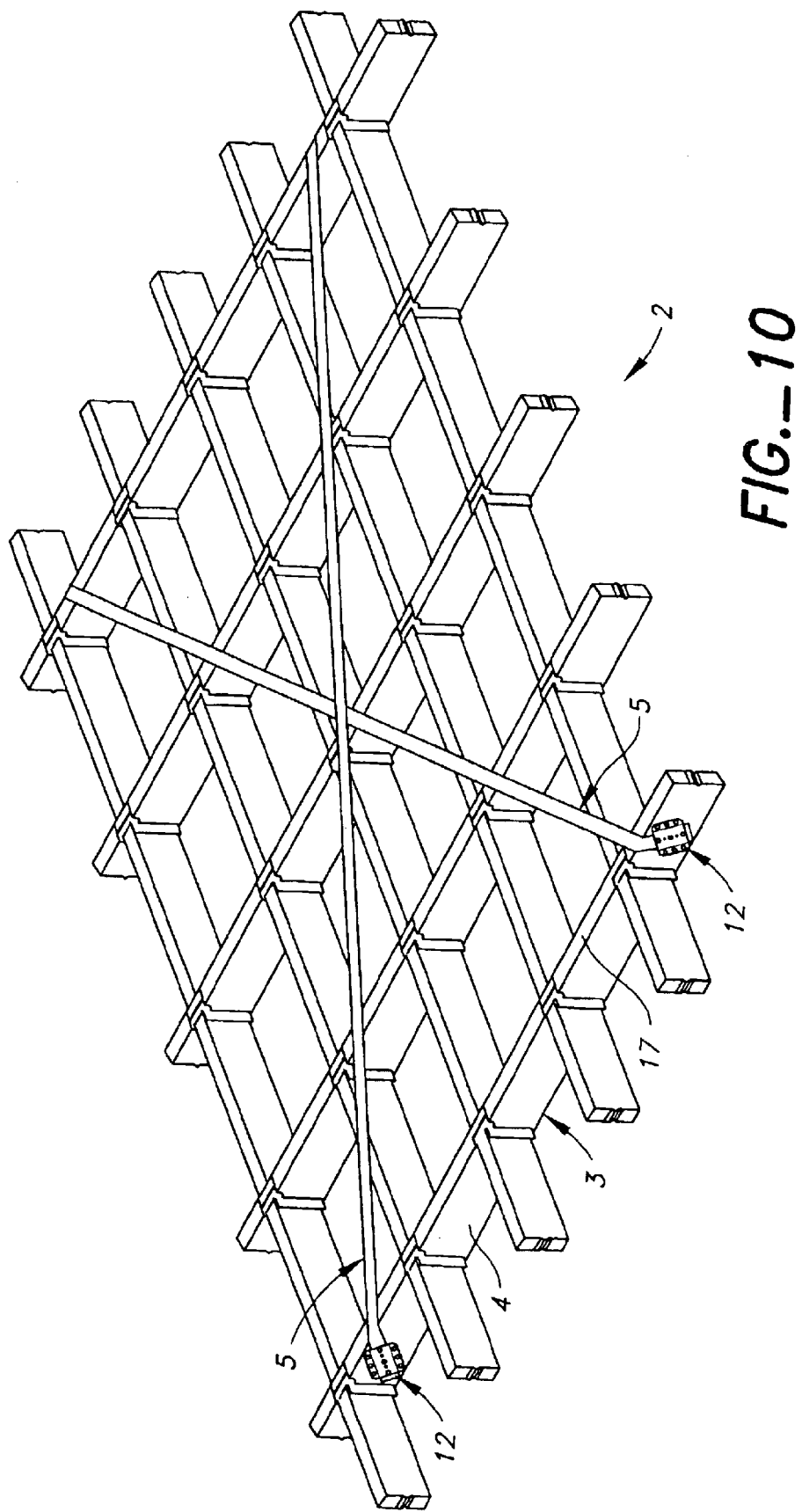
FIG._10

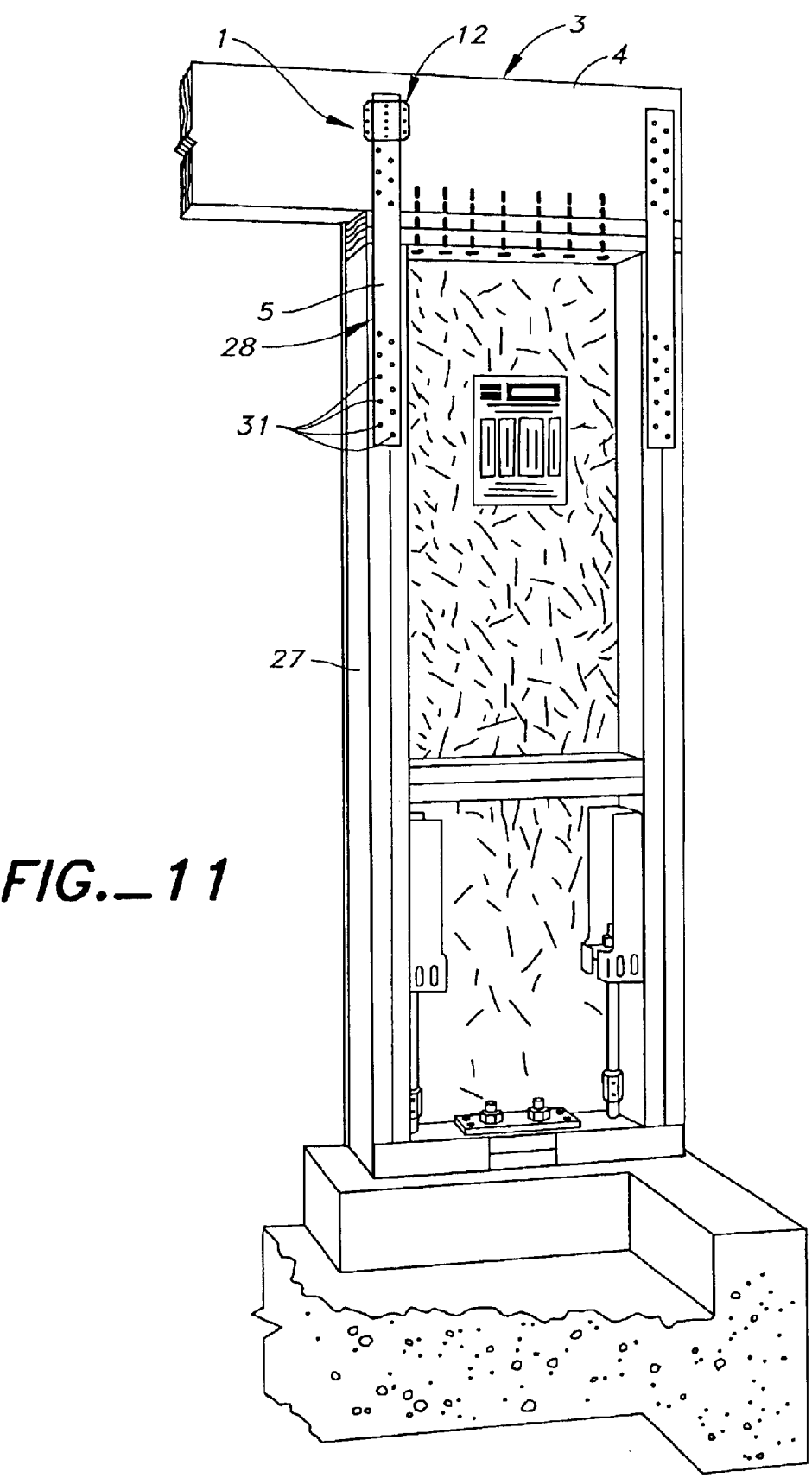
FIG._11

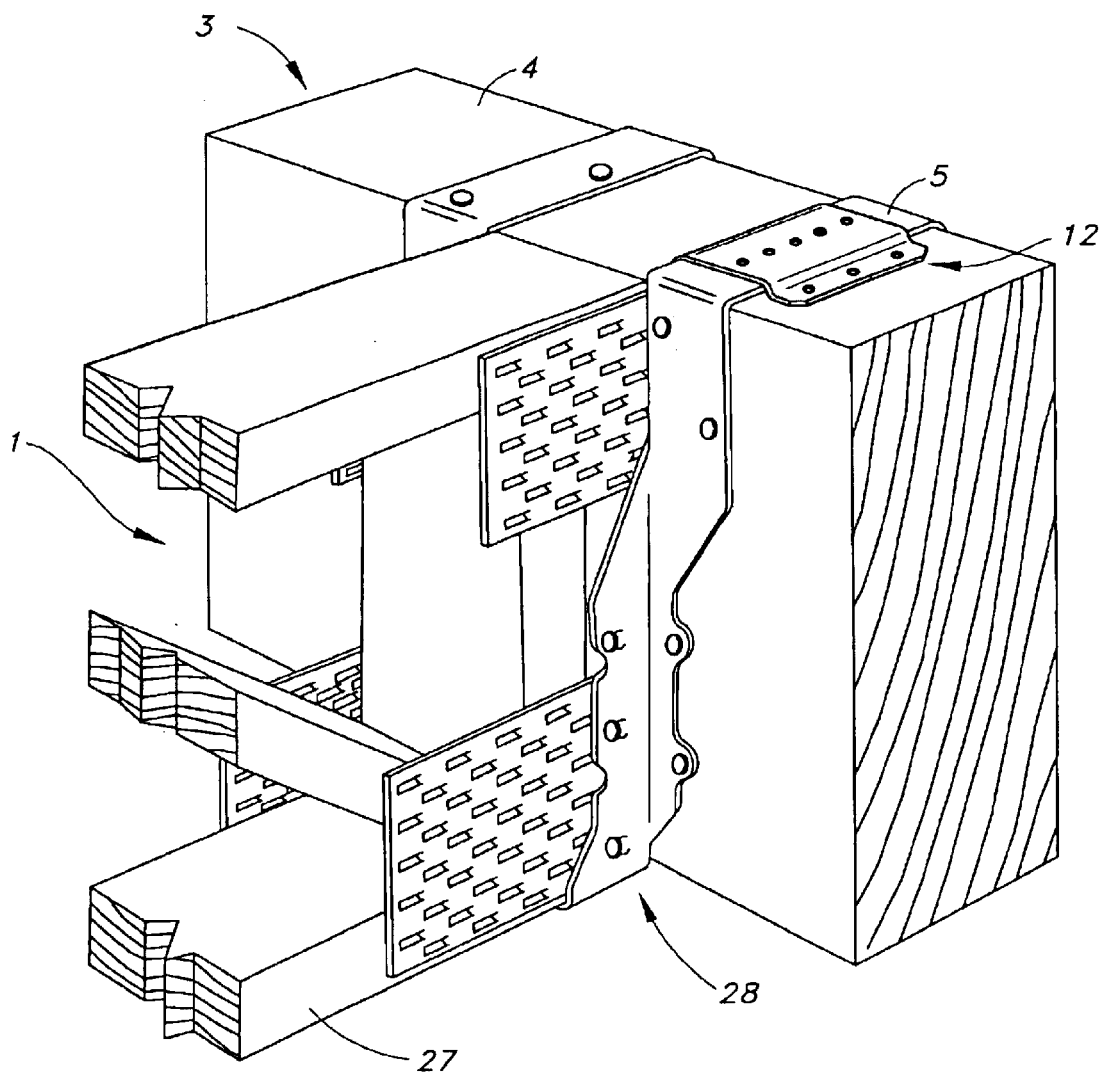
FIG._12

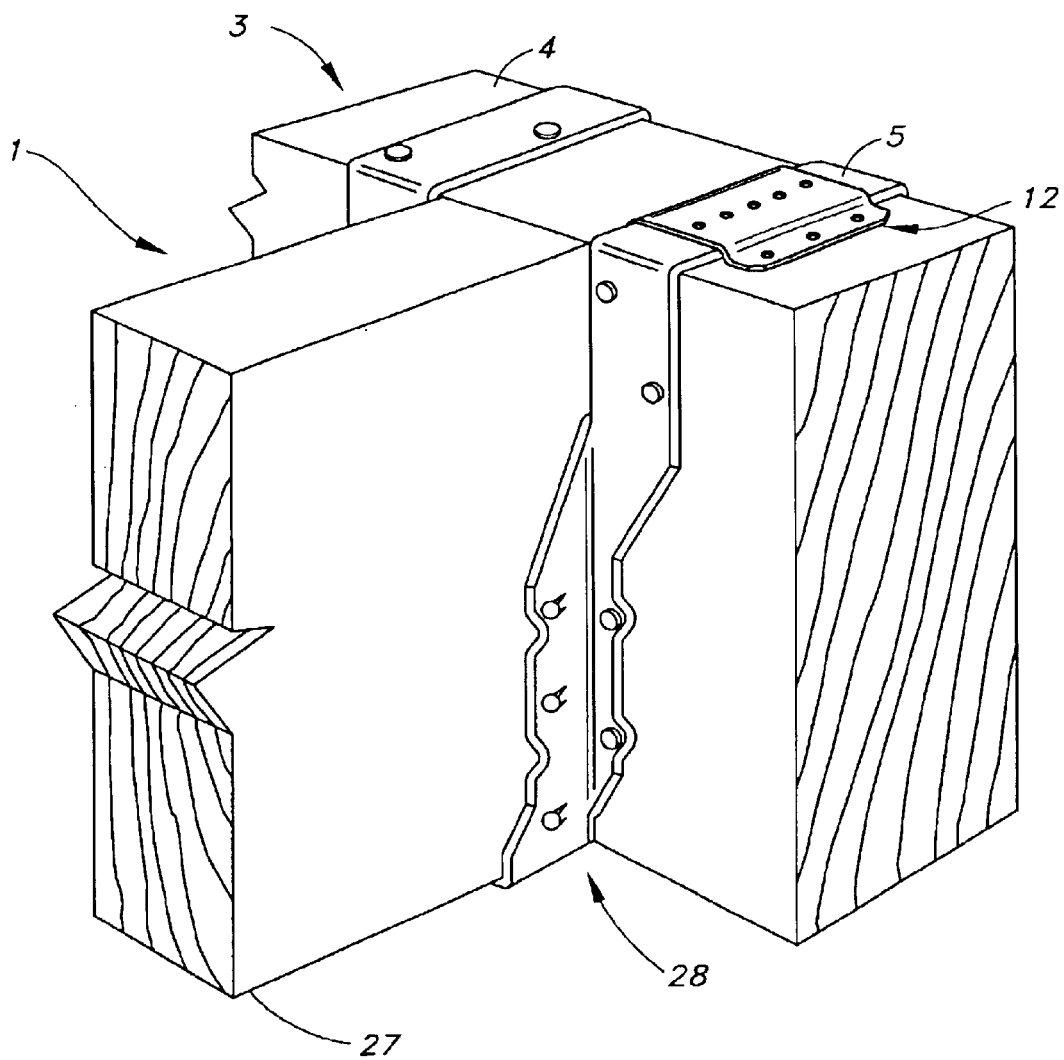
FIG._13

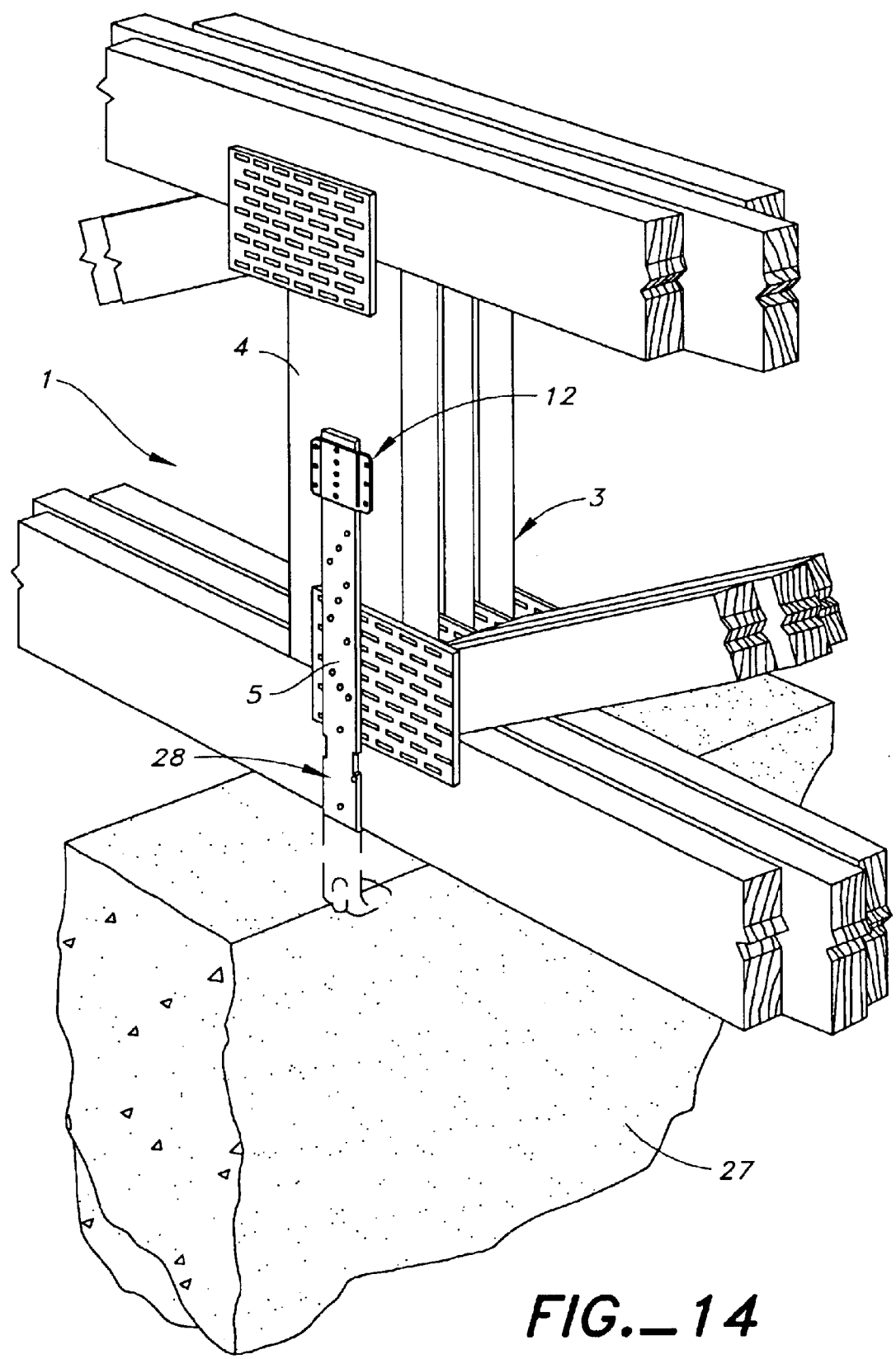
FIG._14

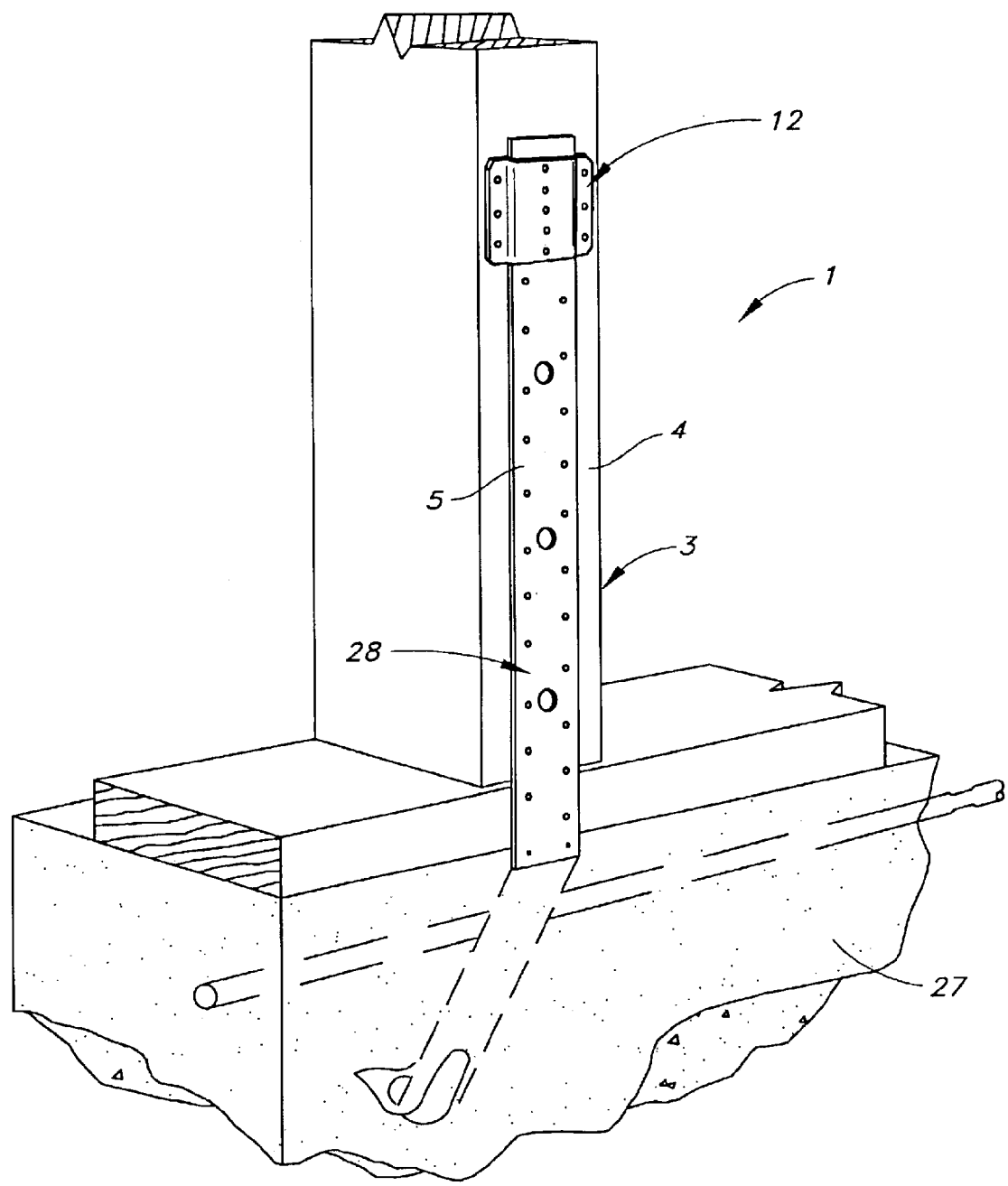
FIG. _ 15

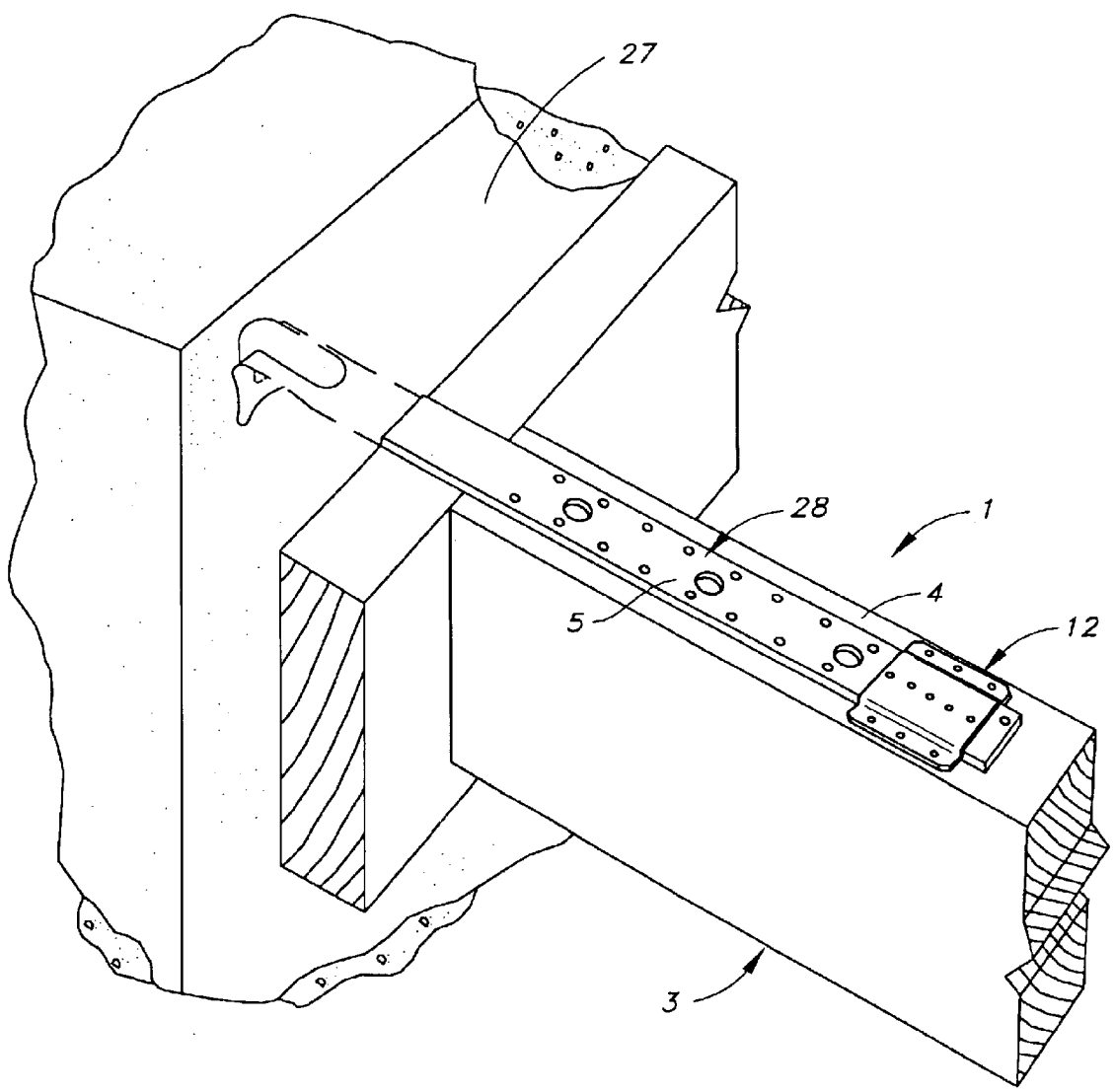
FIG._16

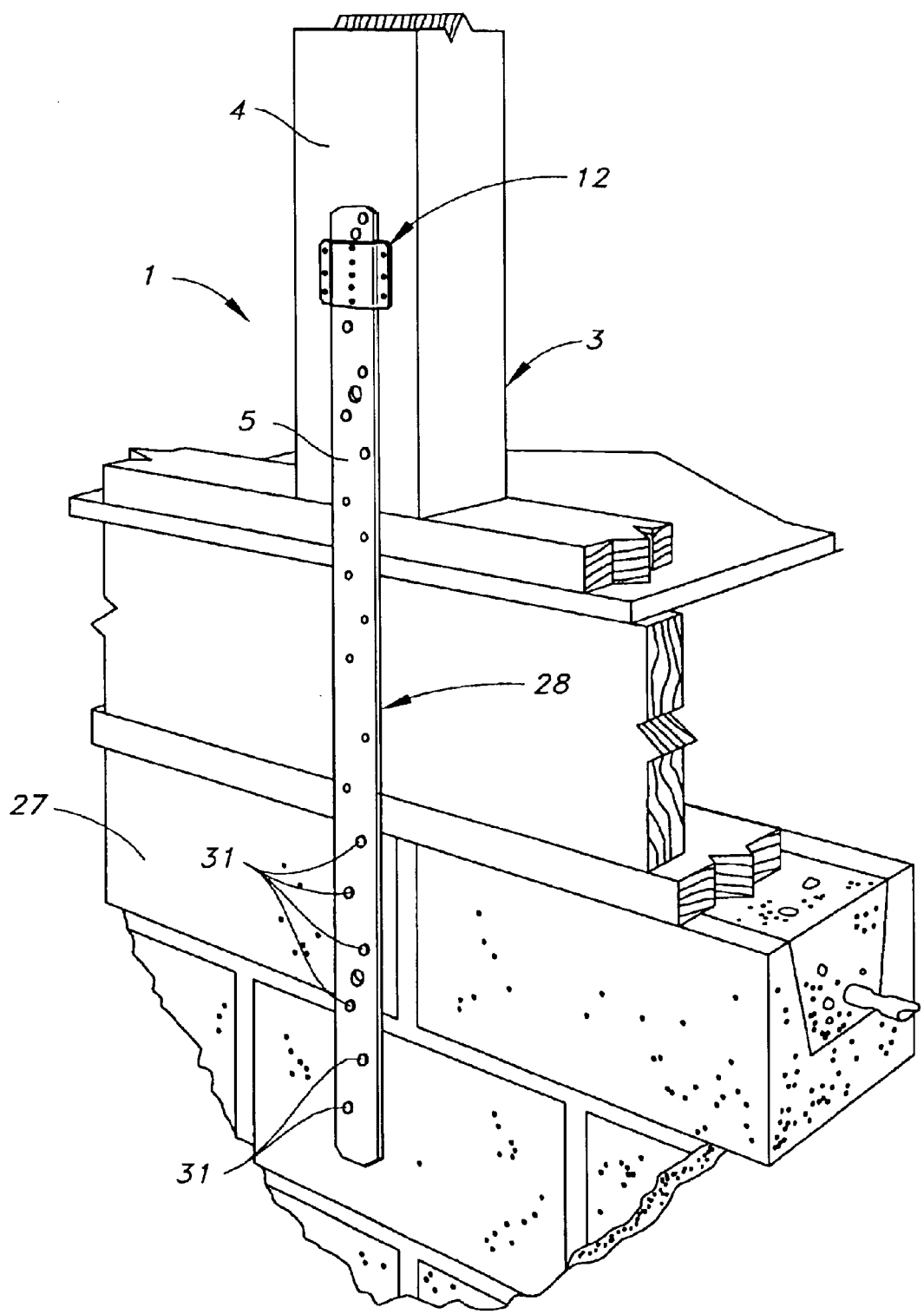
FIG._17

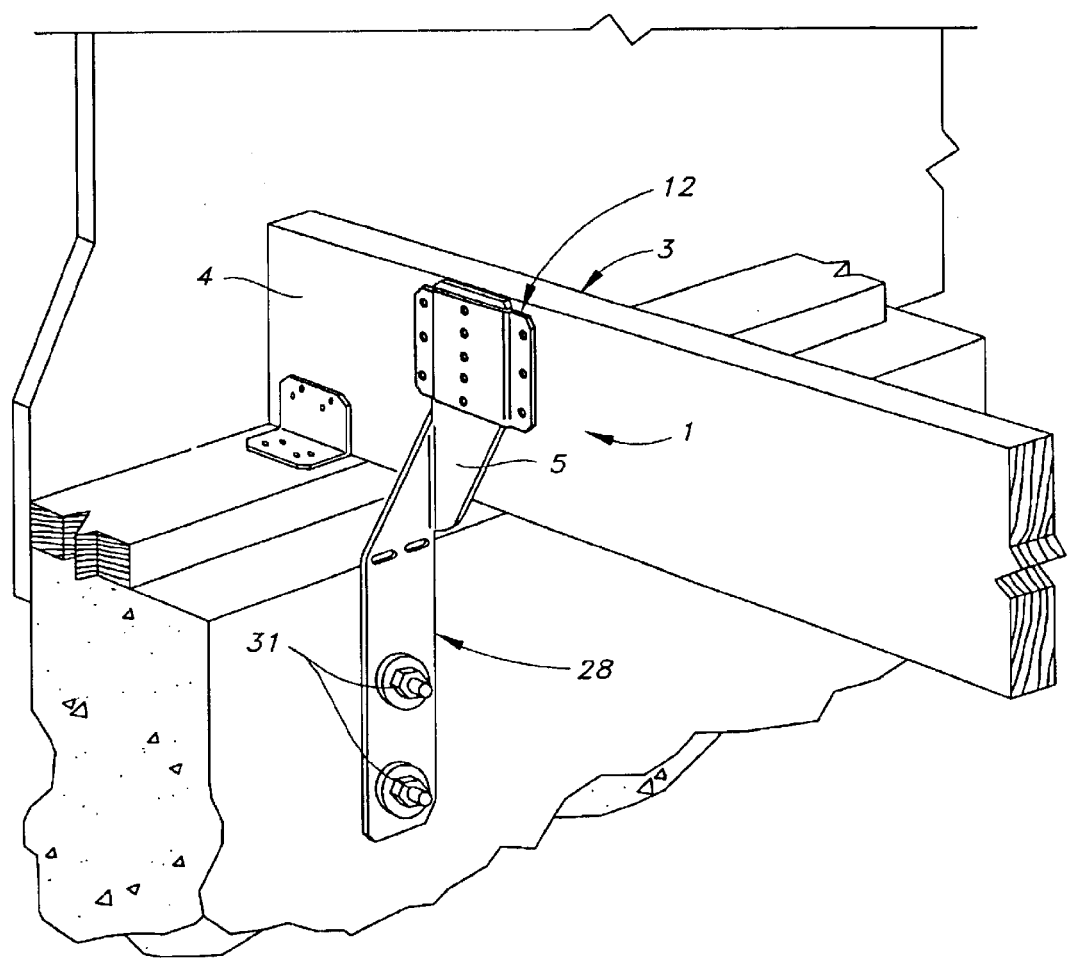
FIG._18

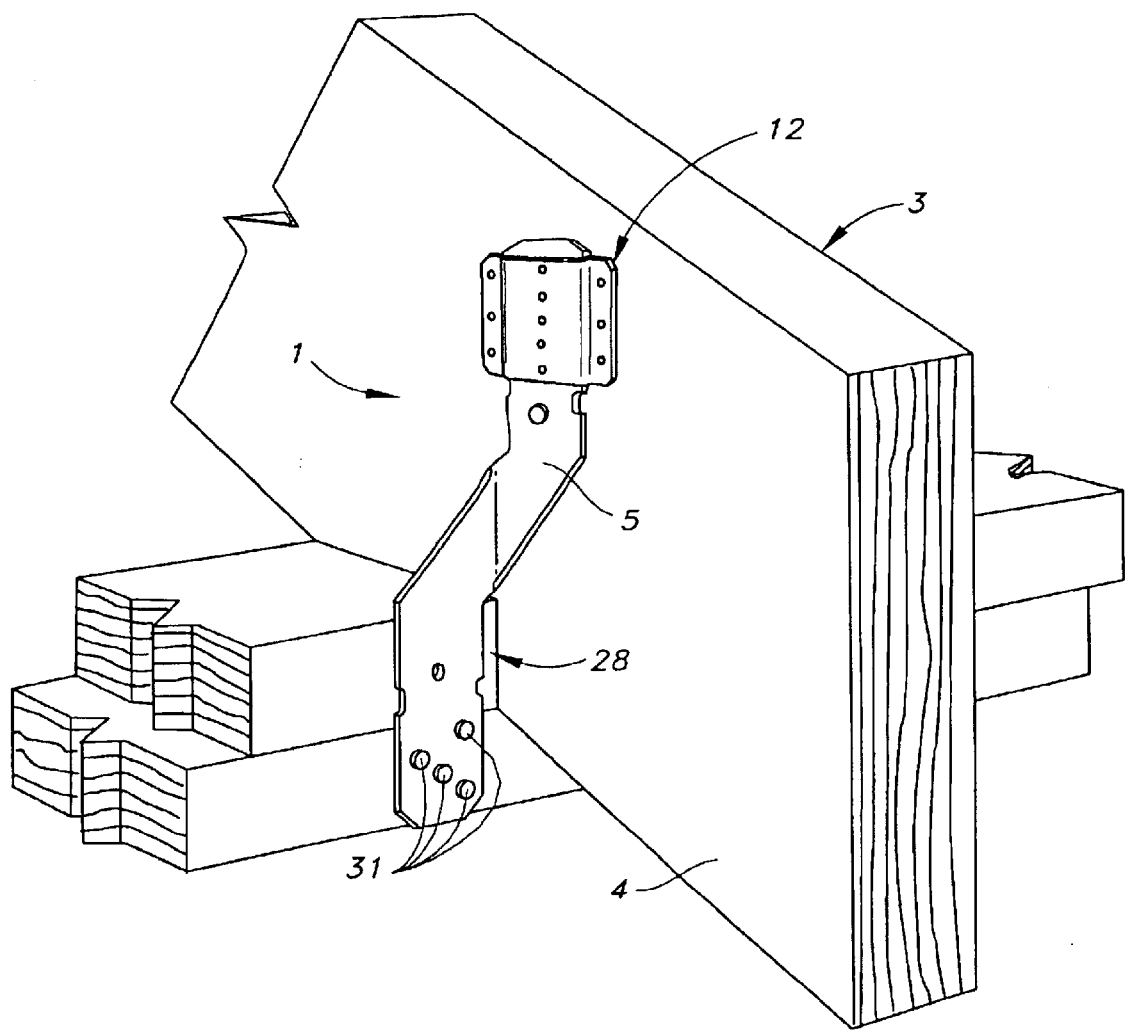
FIG._19

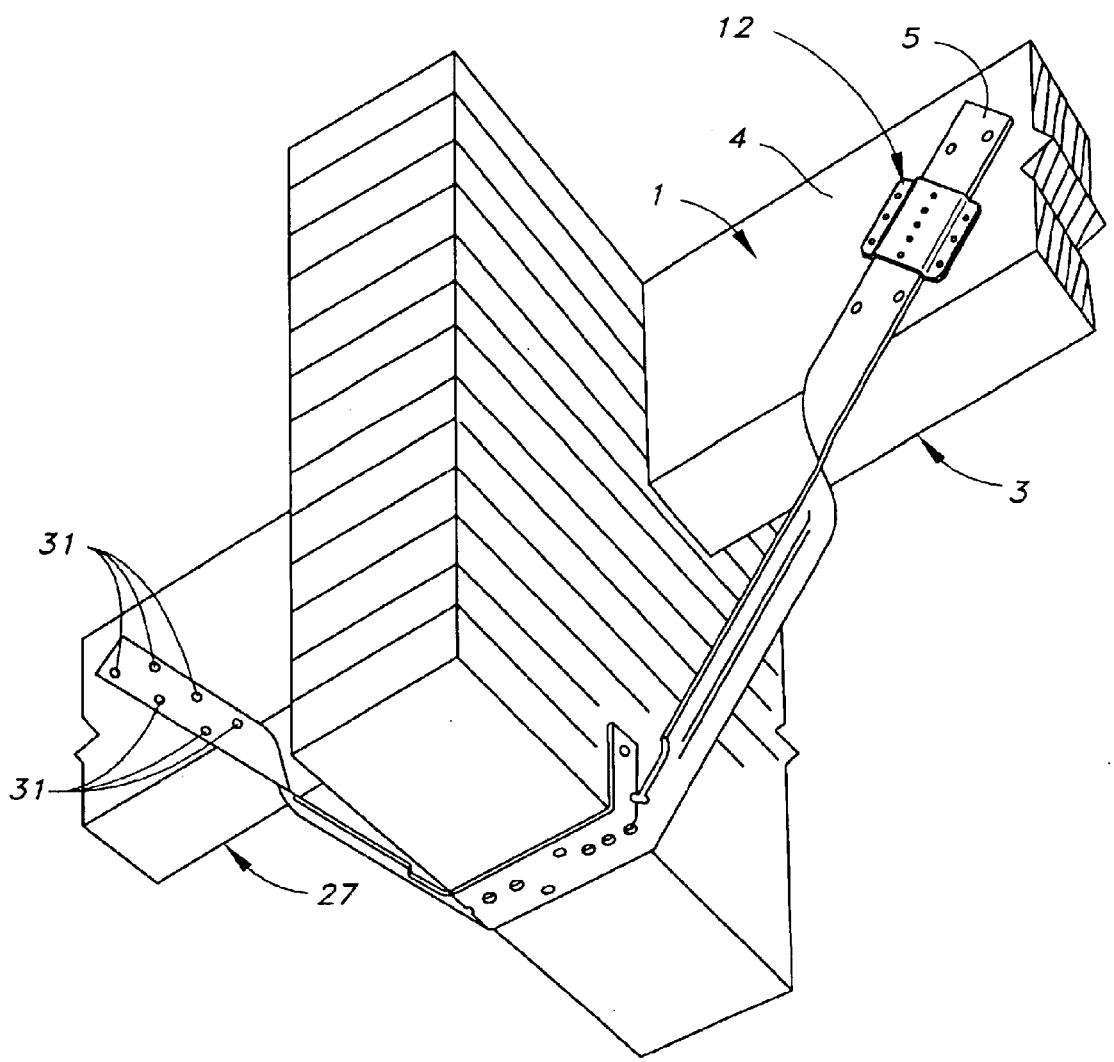
FIG._20

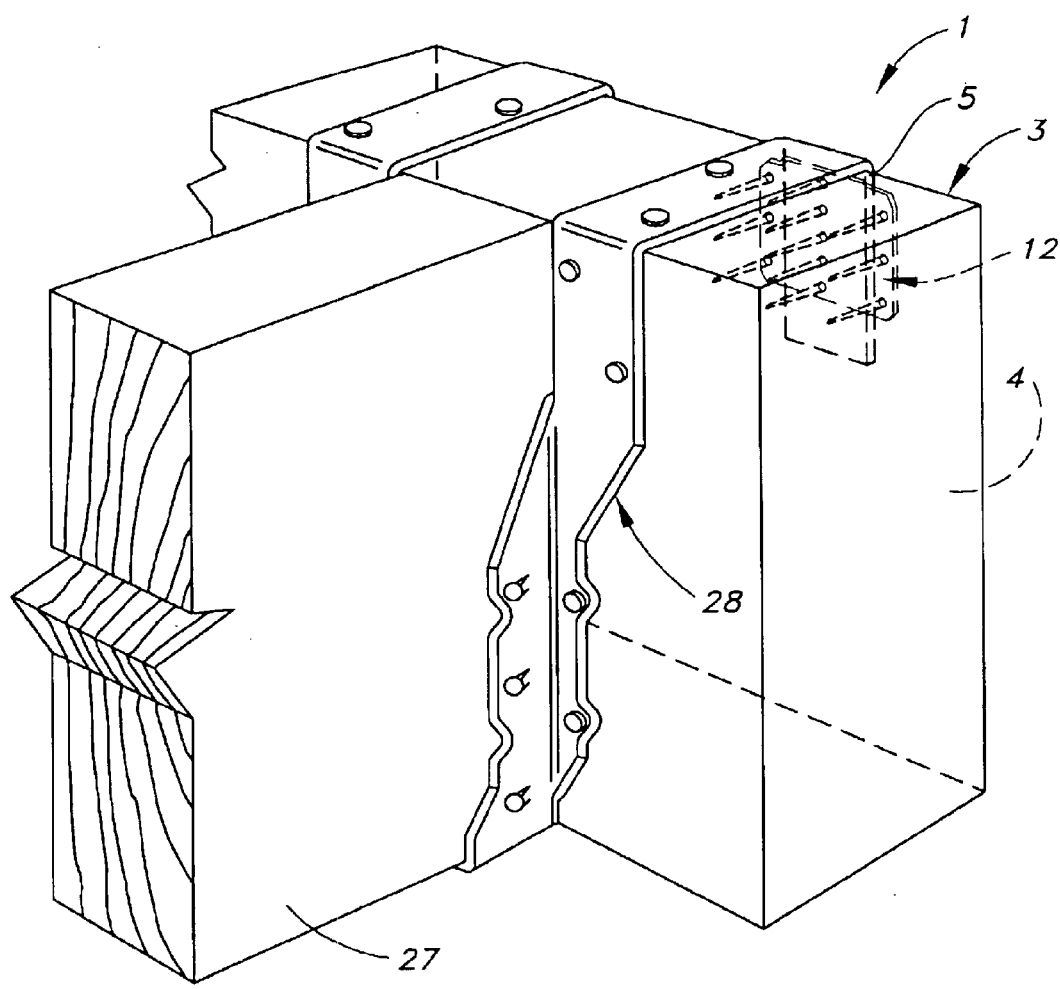
FIG._21

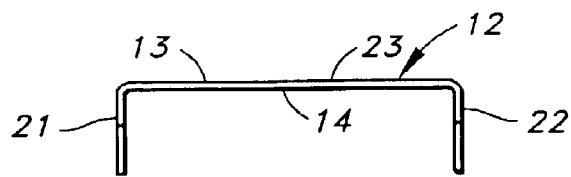
FIG._22
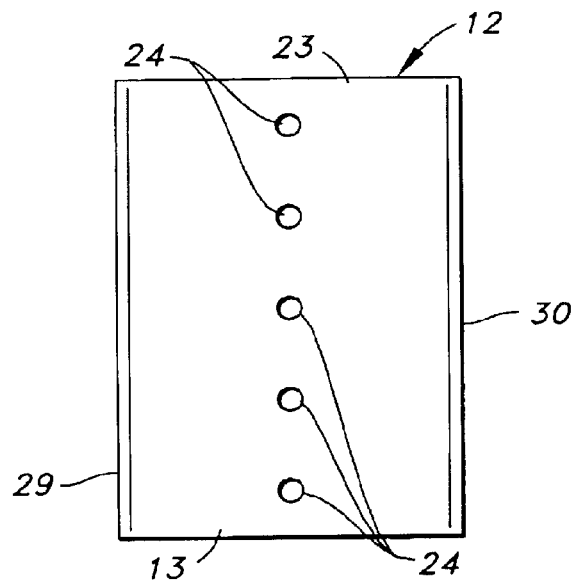
FIG._23
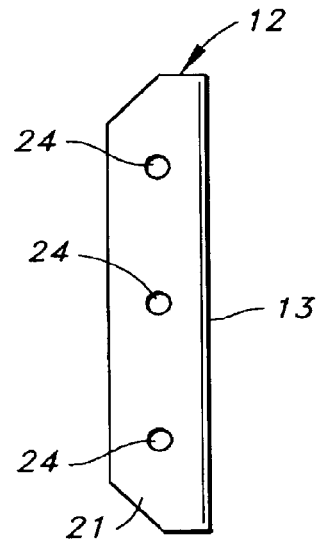
FIG._24
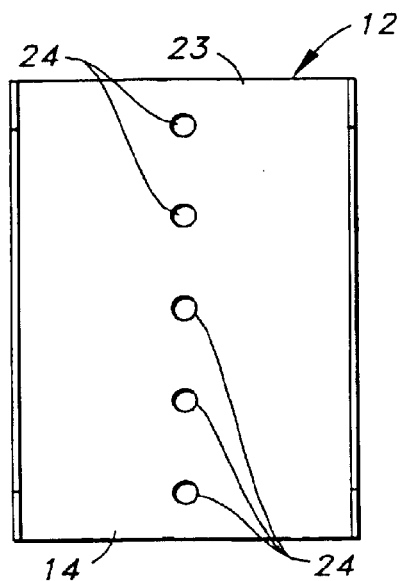
FIG._25

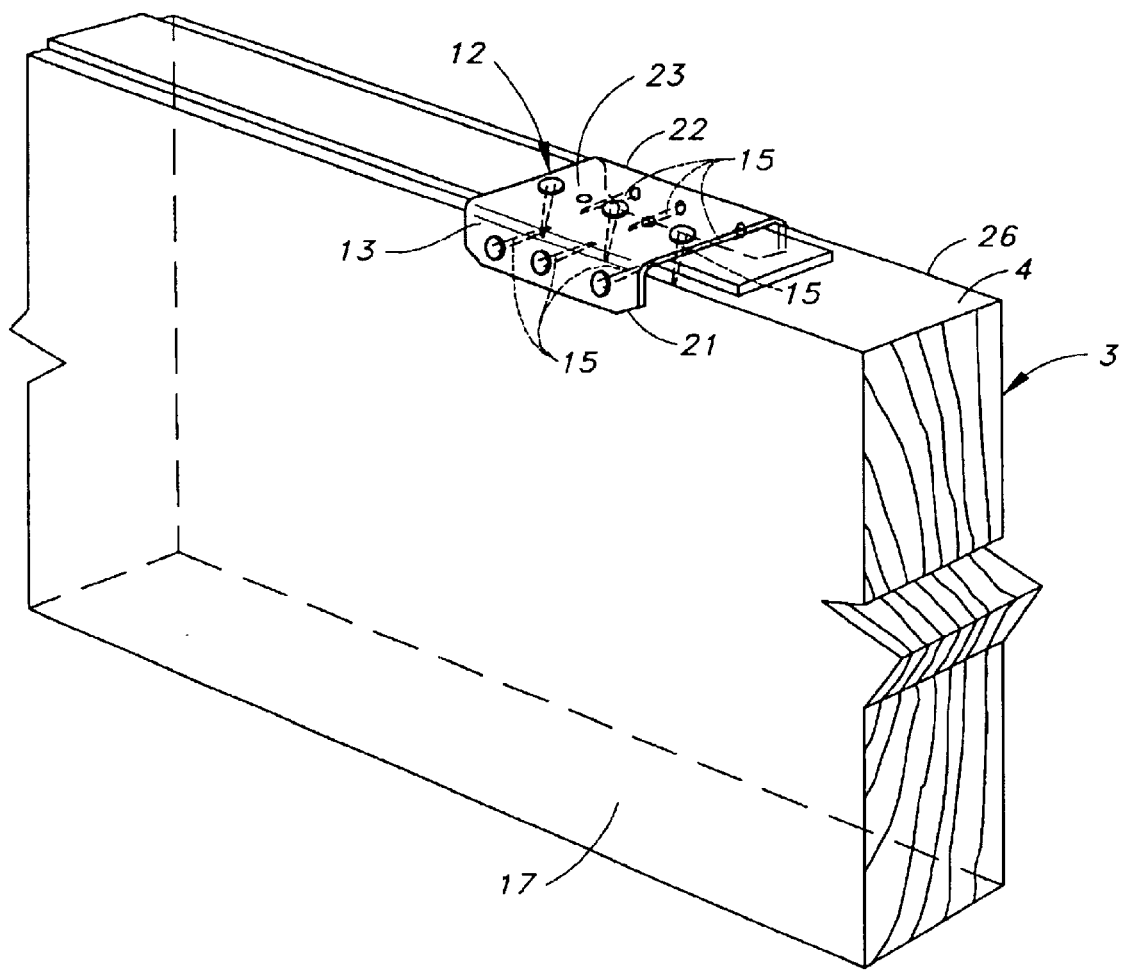
FIG._26

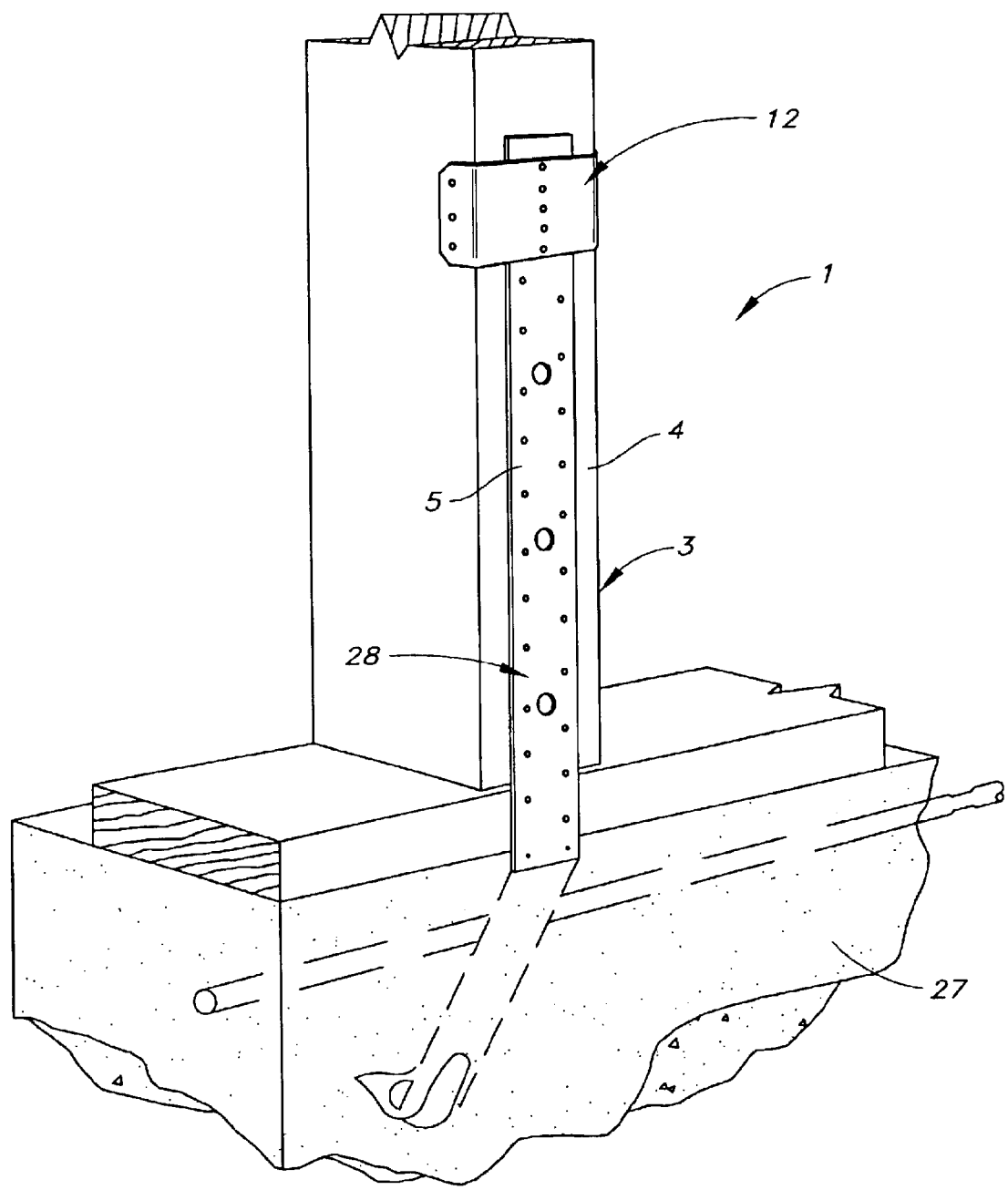
FIG._27

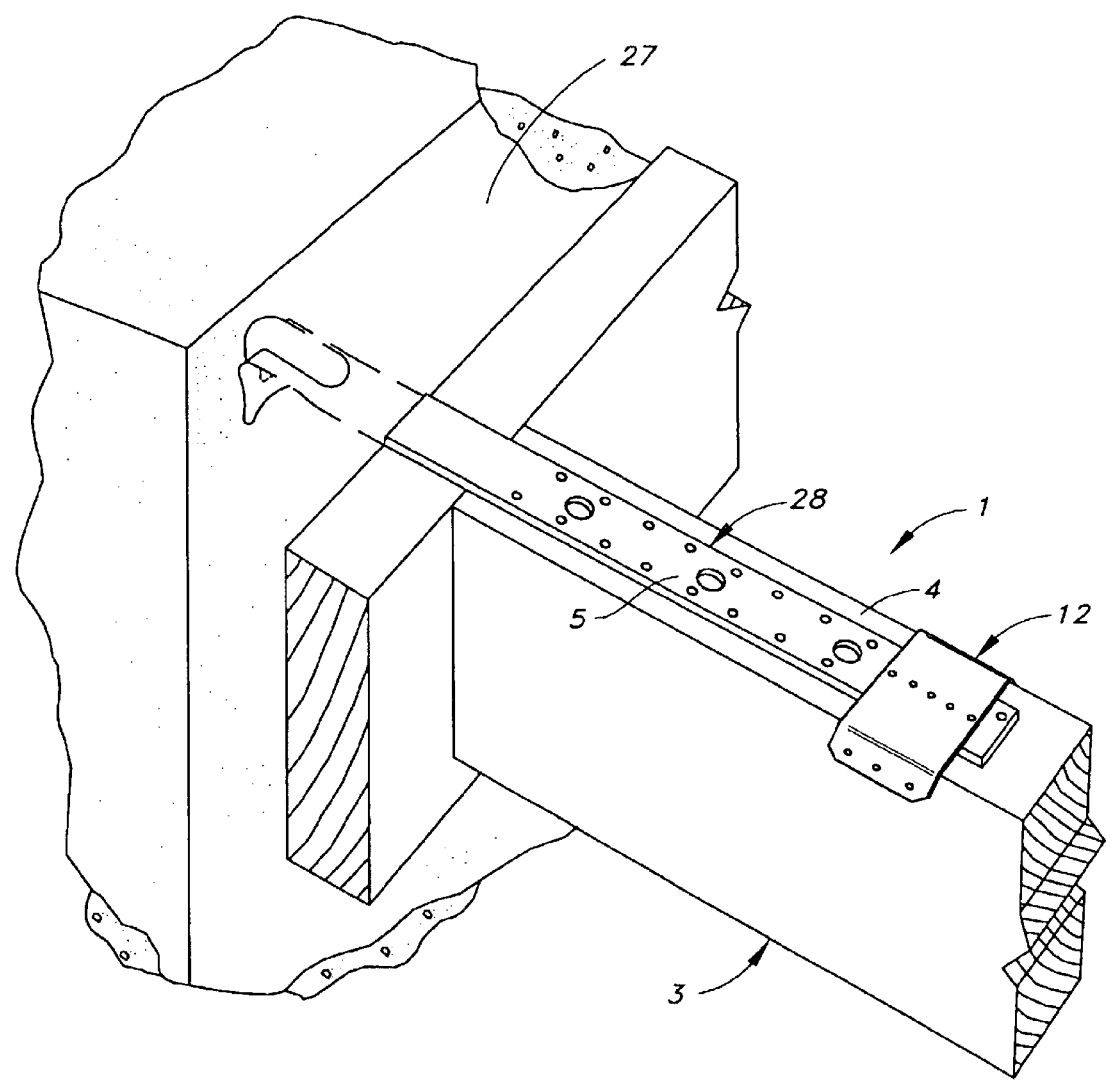
FIG._28

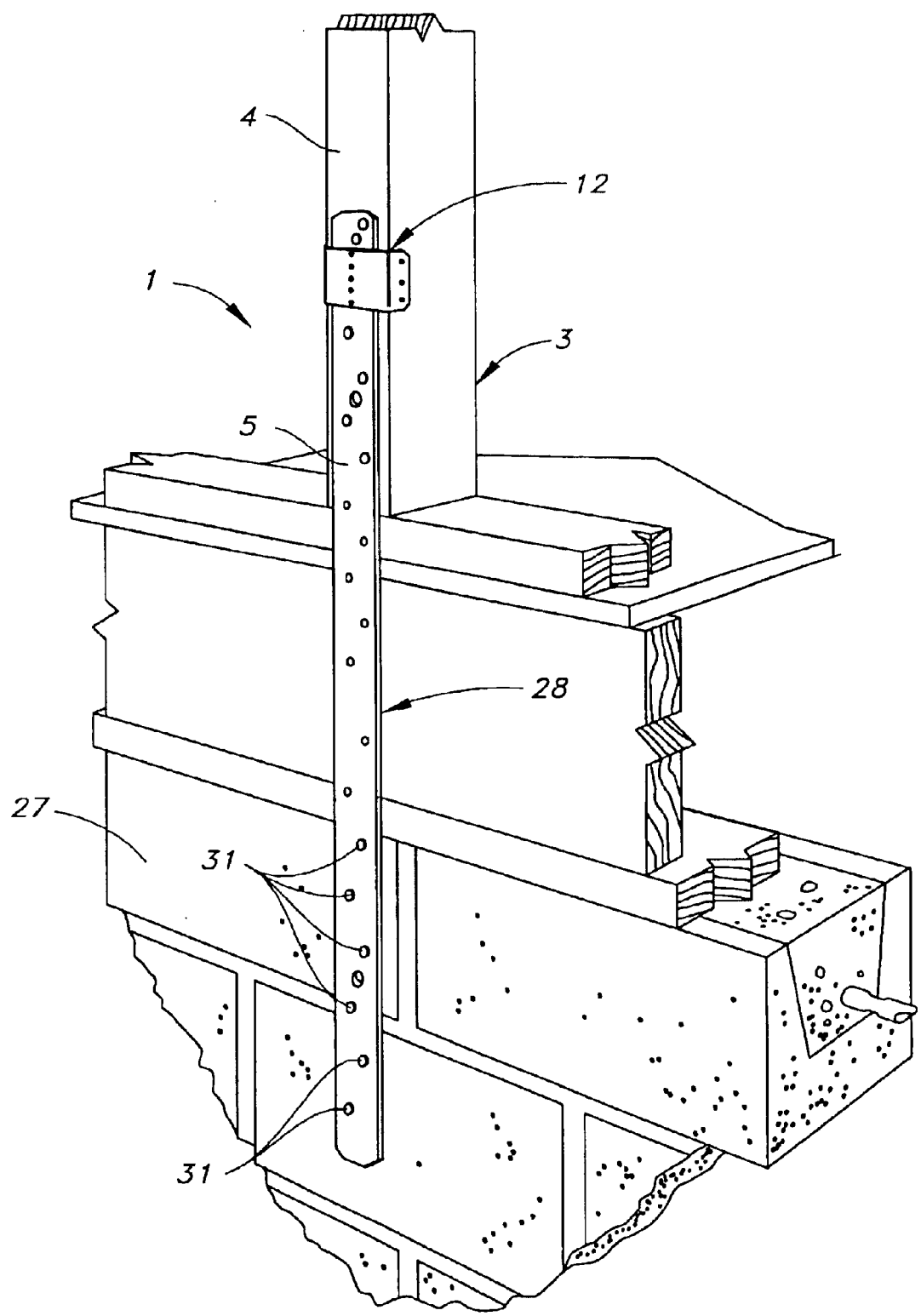
FIG._29

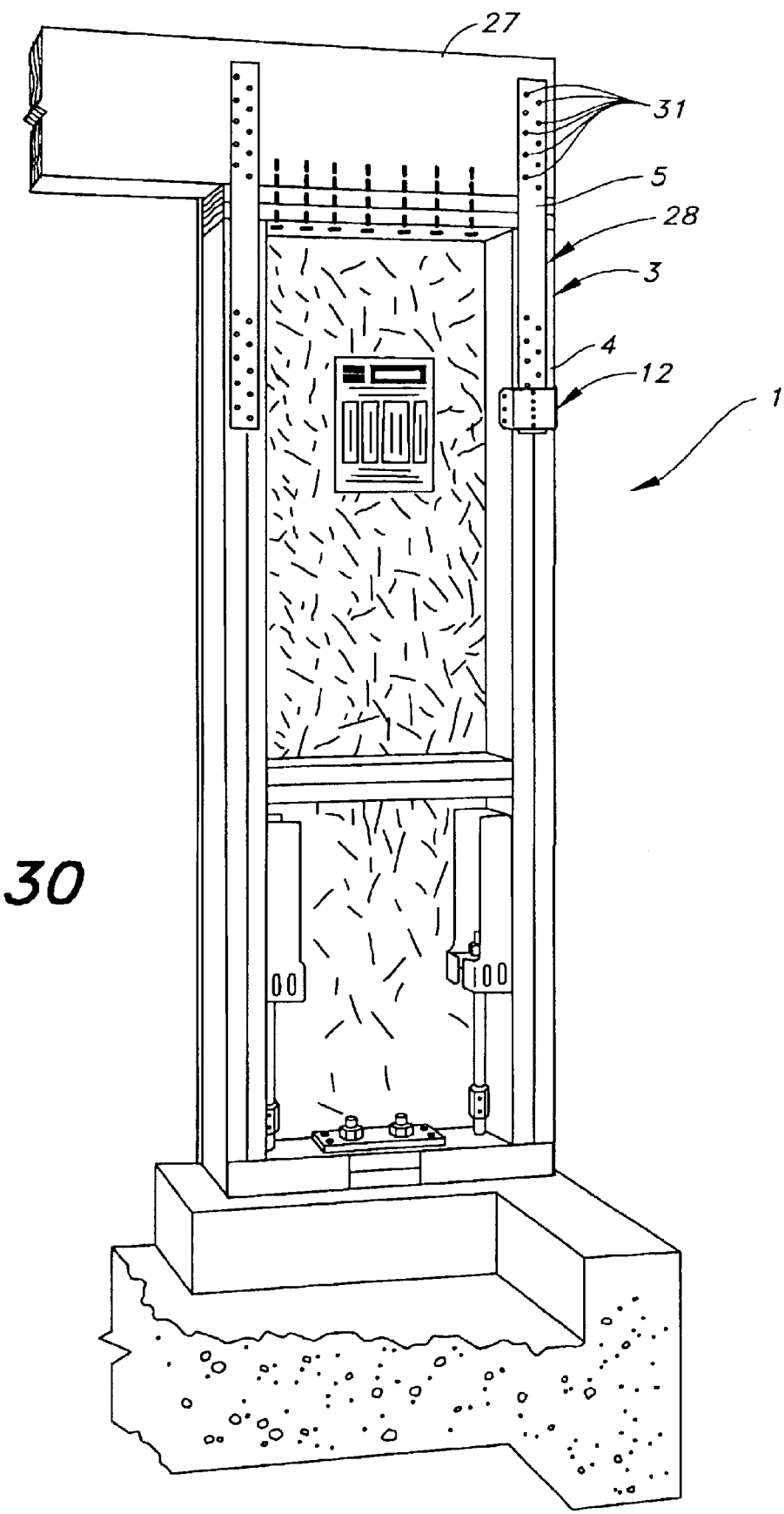
FIG._30

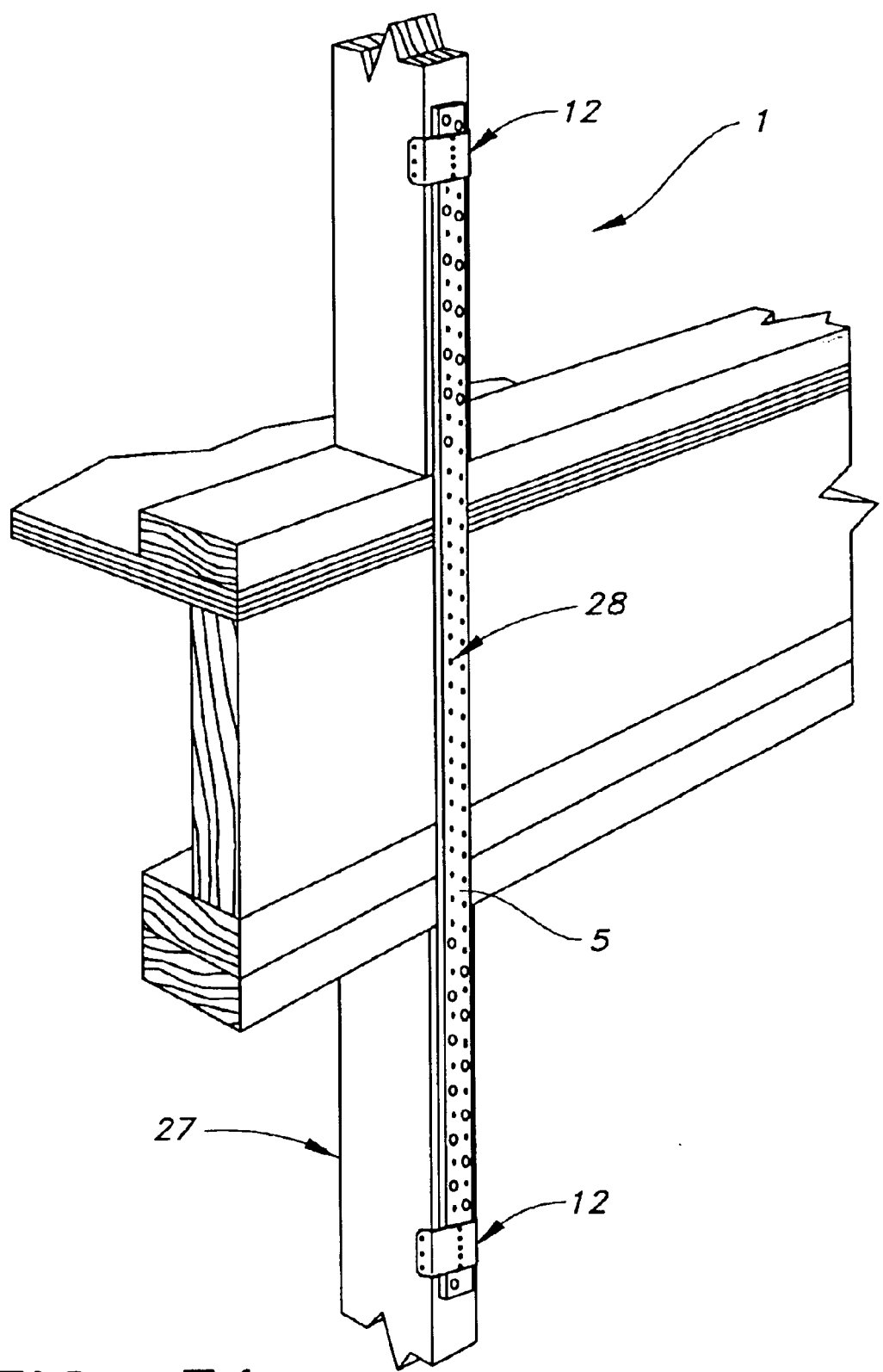
FIG._31

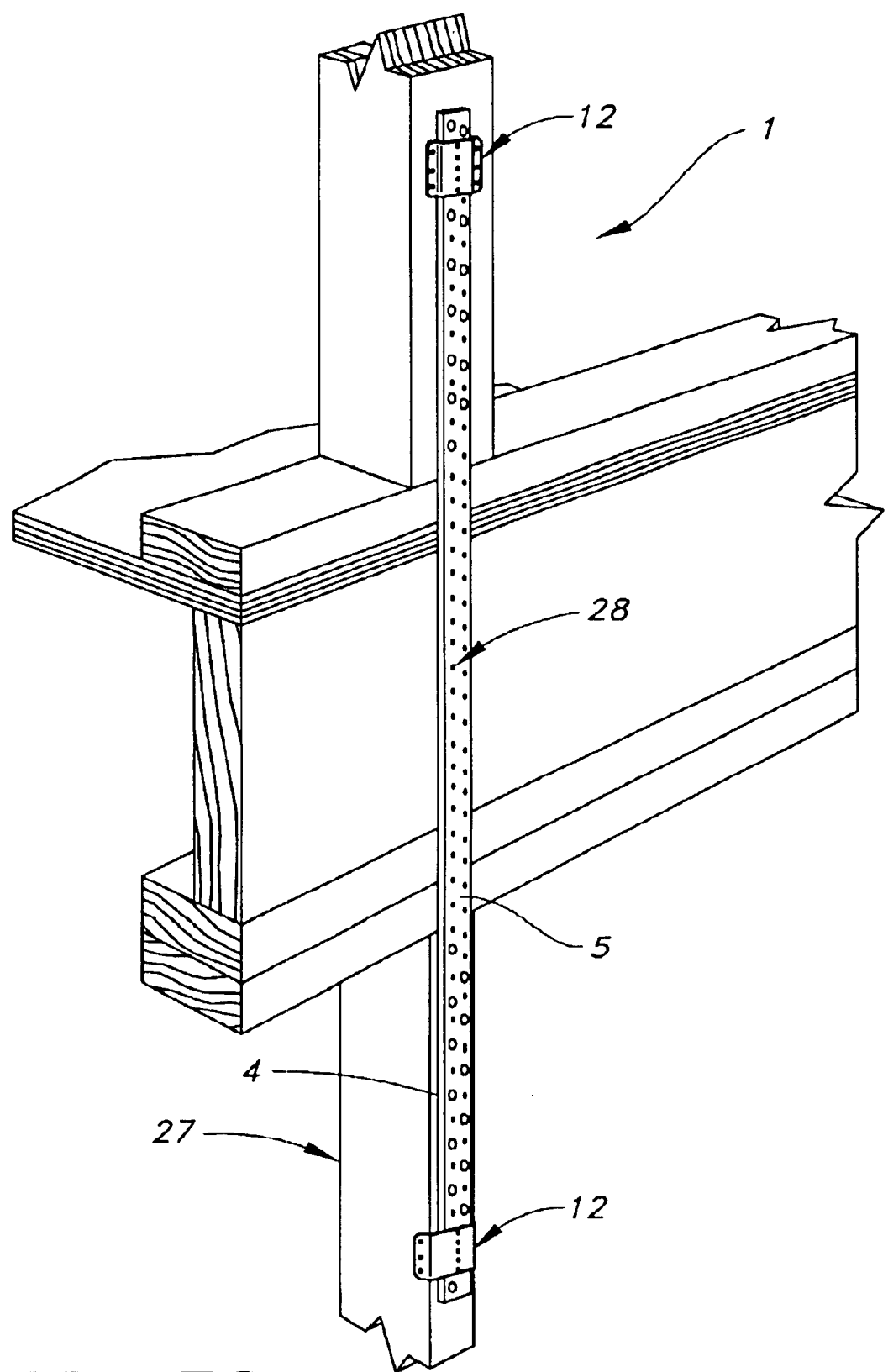
FIG._32

US 6,877,291 B2

STRAP HOLDING DEVICE

This application is a continuation-in-part of copending application Ser. No. 10/000,678 filed on Oct. 30, 2001

BACKGROUND OF THE INVENTION

The present invention relates to a connection in which an elongated strap or a connector having an elongated strap member is secured by a strap holder. Such straps and connectors are used in a variety of building applications, typically in connections that resist tension forces parallel to the main axes of the straps or strap members. A number of connectors with elongated strap members are in common use with a variety of structural members.

The present invention relates to a connection in which a strap bridges a plurality of substantially parallel structural members and is secured by a strap holder, especially where an elongate utility strap is used, typically in pairs forming X bracing, to reinforce roof trusses against forces acting along the length of the roof. Single diagonal braces of this general type are also commonly used in walls in light wood frame construction, and might also be used to brace floor beams or other series of parallel structural members.

SUMMARY OF THE INVENTION

It is an object of the present invention to provide a secure connection between an elongated strap member and a structural member. The present invention improves on the prior art of simply nailing through the strap and into the structural member beneath it. The present invention provides a connection having a plurality of parallel structural members. The structural members are bridged by strap member, preferably light gauge steel. The end of the strap member is held in place by an overlapping strap holder.

Fasteners hold the strap holder and the strap to the underlying structural member, with at least one passing through only the strap holder into the first side of the first structural member.

The different emodiments of the present invention can improve the connections of a variety of connectors with strap members and many different structural members.

BRIEF DESCRIPTION OF THE DRAWINGS

FIG. 1 is an isometric view of a roof, showing three sections of roof trusses connected by strap members arranged in X patterns.

FIG. 2 is an isometric view of a plurality of roof trusses, joined by perpendicular bracing and by connections of the present invention.

FIG. 3 is a side elevation view of the preferred embodiment of the strap holder of the present invention.

FIG. 4 is a top plan view of the preferred embodiment of the strap holder of the present invention.

FIG. 5 is a side elevation view of the preferred embodiment of the strap holder of the present invention, perpendicular to the view of FIG. 3.

FIG. 6 is a bottom plan view of the preferred embodiment of the strap holder of the present invention.

FIG. 7 is a side elevation view of a roof truss showing a plurality of connections of the present invention, in particular the interface of first structural member, strap and strap holder.

FIG. 8 is a side elevation view of the strap holder, strap member and first structural member of the present invention, connected by fasteners.

FIG. 9 is an isometric view of an alternate preferred embodiment of the present invention, in which the plurality of substantially parallel structural members are wall studs.

FIG. 10 is an isometric view of a second alternate preferred embodiment of the present invention, in which the plurality of substantially parallel structural members are floor joists.

FIG. 11 is a perspective view of a preferred embodiment of the present invention, in which the first structural member is a header and the second structural member is a vertical wall stud.

FIG. 12 is a perspective view of a preferred embodiment of the present invention, in which the first structural member is a header and the second structural member is a horizontal chord of a truss.

FIG. 13 is a perspective view of a preferred embodiment of the present invention, in which the first structural member is a header and the second structural member is a horizontal beam.

FIG. 14 is a perspective view of a preferred embodiment of the present invention, in which the first structural member is a truss and the second structural member is a cementitious member.

FIG. 15 is a perspective view of a preferred embodiment of the present invention, in which the first structural member is a wall stud and the second structural member is a concrete foundation.

FIG. 16 is a perspective view of a preferred embodiment of the present invention, in which the first structural member is a purlin and the second structural member is a cementitious wall.

FIG. 17 is a perspective view of a preferred embodiment of the present invention, in which the first structural member is a stud and the second structural member is a cementitious member.

FIG. 18 is a perspective view of a preferred embodiment of the present invention, in which the first structural member is a horizontally-disposed structural member and the second structural member is a cementitious member.

FIG. 19 is a perspective view of a preferred embodiment of the present invention, in which the first structural member is an angled structural member and the second structural member is a horizontally-disposed structural member.

FIG. 20 is a perspective view of a preferred embodiment of the present invention, in which the first and second structural members are colinear.

FIG. 21 is a perspective view of a preferred embodiment of the present invention, in which the first structural member is a header and the second structural member is a horizontal beam, and the top flange of the hanger is bent over to interface with the back of the header.

FIG. 22 is a front elevation view of a preferred embodiment of the strap holder of the present invention.

FIG. 23 is a top plan view of a preferred embodiment of the strap holder of the present invention.

FIG. 24 is a side elevation view of a preferred embodiment of the strap holder of the present invention.

FIG. 25 is a bottom plan view of a preferred embodiment of the strap holder of the present invention.

FIG. 26 is a perspective view of a preferred embodiment of the present invention, showing attachment to three sides of the first structural member.

FIG. 27 is a perspective view of a preferred embodiment of the present invention, in which the first structural member is a wall stud and the second structural member is a concrete foundation.

FIG. 28 is a perspective view of a preferred embodiment of the present invention, in which the first structural member is a purlin and the second structural member is a cementitious wall.

FIG. 29 is a perspective view of a preferred embodiment of the present invention, in which the first structural member is a stud and the second structural member is a cementitious member.

FIG. 30 is a perspective view of a preferred embodiment of the present invention, in which the first structural member is vertical wall stud and the second structural member is a header.

FIG. 31 is a perspective view of a preferred embodiment of the present invention, in which the first and second structural members are colinear and strap holders of the present invention interface with both.

FIG. 32 is a perspective view of a preferred embodiment of the present invention, in which the first and second structural members are colinear, the first structural member interfaces with one preferred embodiment of the present invention, and the second structural member interfaces with another preferred embodiment of the present invention.

DETAILED DESCRIPTION OF THE PREFERRED EMBODIMENTS

As best seen in FIG. 2, the preferred form of the present invention is a connection 1 comprising a plurality of substantially parallel structural members 2, a first structural member 3 having a first side 4, a strap member 5 having an upper surface 6, a lower surface 7, a first side edge 8, a second side edge 9, and a first end edge 10, a strap holder 12 having an upper face 13 and a lower face 14, the lower face 14 being dimensioned to interface with the first side 4 of the first structural member 3 and attached only to the first structural member 3 of the plurality of structural members 2, and a plurality of fasteners 15. The lower surface 7 of the strap member 5 interfaces with the first side 4 of the first structural member 3, the lower face 14 of the strap holder 12 interfaces with the upper surface 6 of the strap member 5, extending beyond the first side edge 8 to interface with the first side 4 of the first structural member 3, at least one of the plurality of fasteners 15 passes through both the strap holder 12 and the strap member 5 and into the first side 4 of the first structural member 3, at least one of the plurality of fasteners 15 passes through only the strap holder 12 into the first side 4 of the first structural member 3, and the strap member 5 crosses over the plurality of substantially parallel structural members 2. As shown in FIG. 2, in the preferred embodiment of the present invention, the substantially parallel structural members 2 are the top members of roof trusses 11. The connection 1 of the present invention is paired to create X bracing that reinforces the roof 16 against forces acting primarily along the length of the roof 16, which is otherwise relatively rigid where it joins the wall below, which is typically reinforced by sheathing against shear forces acting along the length of the wall. As shown in FIG. 1, a number of areas of the roof 16 are reinforced with X bracing, which is often required by building codes.

As best shown in FIG. 7 and in detail in FIG. 8 in the preferred embodiment the first structural member 3 further comprises a second side 17 and a first juncture 18 between the first side 4 and the second side 17. The strap member 5 is bent over the first juncture 18 and interfaces with the second side 17.

As best shown in FIG. 3, FIG. 4, FIG. 5, and FIG. 6, in the preferred embodiment the strap holder 12 additionally comprises a first transition line 19 and a second transition line 20, the first transition line 19 and the second transition line 20 dividing the upper face 13 and the lower face 14 into a first attachment portion 21, a second attachment portion 22, and a first securement portion 23 between the first transition line 19 and the second transition line 20, and wherein the first securement portion 23 is dimensioned to closely interface with the upper surface 6 of the strap member 5, the first transition line 19 closely parallel to the first side edge 8 and the second transition line 20 closely parallel to the second side edge 9. In the preferred embodiment, the first transition line 19 and the second transition line 20 are double bends that create a raised securement portion 23 that bisects the middle of the strap holder 12.

As best shown in FIG. 7 and FIG. 8, in the preferred embodiment one or more of the plurality of fasteners 15 passes through the first attachment portion 21 into the first side 4 of the first structural member 3, one or more of the plurality of fasteners 15 passes through the second attachment portion 22 into the first side 4 of the first structural member 3, and one or more of the plurality of fasteners 15 passes through the first securement portion 23, through the strap member 5, and into the first side 4 of the first structural member 3.

As shown in FIG. 2, in the preferred embodiment, the plurality of substantially parallel structural members 2 and the first structural member 3 are the top chords of roof trusses 11 and the top chords of roof trusses 25 are made of wood. As shown in FIG. 10, in an alternate preferred embodiment, the plurality of substantially parallel structural members 2 and the first structural member 3 are floor beams, and the floor beams are made of wood. As shown in FIG. 9, in another alternate preferred embodiment, the plurality of substantially parallel structural members 2 and the first structural member 3 are wall studs. Notwithstanding the above, the substantially parallel structural members 2 may be any such series of structural members, and may made of any material, such as steel. In the preferred embodiment, the fasteners 15 are nails, although they may be screws, bolts or any other type of pin-like fastener.

In the preferred embodiment, the strap member 5 and strap holder 12 are both formed from light gauge steel, but either or both may be formed from other metals or plastics, or any other material that may be formed into the necessary shapes.

In the preferred embodiment, the strap holder 12 is formed with a plurality of fastener openings 24 and the strap member 5 is also formed with a plurality of fastener openings 25.

As best shown in FIG. 2, in an alternate preferred embodiment the present invention is a connection 1 comprising a first structural member 3, having a first side 4, a second side 17, and a third side 26, a second structural member 27, a connector 28 having an elongated strap member 5, the strap member 5 having an upper surface 6, a lower surface 7, a first side edge 8, a second side edge 9, and a first end edge 10, a strap holder 12 having an upper face 13 and a lower face 14, the lower face 14 being dimensioned to interface with the first side 4 of the first structural member 3 the strap holder 12 being not attached to the second structural member 27, and a first plurality of fasteners 15. The lower surface 7 of the strap member 5 interfaces with the first side 4 of the first structural member 3, the lower face 14 of the strap holder 12 interfaces with the upper surface 6 of the strap member 5, extending beyond the first side edge 8 of the strap member 6 to interface with the first structural member 3, at least one of the first plurality of fasteners 15 passes through both the strap holder 12 and the strap member 5 and into the first side 4 of the first structural member 3, at least one of the first plurality of fasteners 15 passes through only the strap holder 12 into the first structural member 3, and the connector 28 having the strap member 5 connects to the second structural member 27.

As best shown in FIG. 8, preferably at least one of the first plurality of fasteners 15 passes through only the strap holder 12 into the first side 4 of the first structural member 3.

As best shown in FIGS. 3, 4, 5, and 6, preferably the strap holder 12 additionally comprises a first transition line 19 and a second transition line 20, the first transition line 19 and the second transition line 20 dividing the upper face 13 and the lower face 14 into a first attachment portion 21, a second attachment portion 22, and a first securement portion 23 between the first transition line 19 and the second transition line 20. The first securement portion 23 is dimensioned to closely interface with the upper surface 6 of the strap member 5, the first transition line 19 being closely parallel to the first side edge 8 of the strap and the second transition line 20 being closely parallel to the second side 17 edge 9 of the strap.

As best shown in FIGS. 7 and 8, preferably one or more of the first plurality of fasteners 15 passes through the first attachment portion 21 into the first side 4 of the first structural member 3, one or more of the first plurality of fasteners 15 passes through the second attachment portion 22 into the first side 4 of the first structural member 3, and one of more of the first plurality of fasteners 15 passes through the first securement portion 23, through the strap member 5, and into the first side 4 of the first structural member 3.

As best shown in FIG. 11, in a preferred embodiment the first structural member 3 is a header and the first side 4 of the first structural member 3 is a vertical face of a header, the connector 28 and the strap member 5 are an elongated metal strap, the second structural member 27 is a vertical wall stud, and a second plurality of fasteners 31 attach the elongated metal strap to the vertical wall stud.

As best shown in FIG. 12, in a preferred embodiment the first structural member 3 is a header and the first side 4 of the first structural member 3 is a horizontal top face of the header, the connector 28 is a truss hanger and the strap member 5 is a top flange of the truss hanger, and the second structural member 27 is a horizontal chord of a truss.

As best shown in FIG. 13, in a preferred embodiment the first structural member 3 is a header and the first side 4 of the first structural member 3 is a horizontal top face of the header, the connector 28 is a joist hanger and the strap member 5 is a top flange of the joist hanger, and the second structural member 27 is a horizontal beam As best shown in FIG. 14, in a preferred embodiment the first structural member 3 is a truss member and the first side 4 of the first structural member 3 is a vertical face of the truss member, the connector 28 is an embedded truss anchor and the strap member 5 is a strap portion of the embedded truss anchor, and the second structural member 27 is a cementitious member.

As best shown in FIG. 15, in a preferred embodiment the first structural member 3 is a wall stud and the first side 4 of the first structural member 3 is a vertical face of the wall stud, the connector 28 is a strap holdown and the strap member 5 is a strap portion of the strap holdown, the second structural member 27 is a concrete foundation.

As best shown in FIG. 16, in a preferred embodiment the first structural member 3 is a purlin and the first side 4 of the first structural member 3 is a horizontal top face of the purlin, the connector 28 is a purlin anchor and the strap member 5 is a strap portion of the purlin anchor, and the second structural member 27 is cementitious wall.

As best shown in FIG. 17, in a preferred embodiment the first structural member 3 is a stud and the first side 4 of the first structural member 3 is a vertical face of the stud, the connector 28 and the strap member 5 are an elongated metal strap, the second structural member 27 is a cementitious member, and a second plurality of fasteners 31 attaches the elongated metal strap to the cementitious member.

As best shown in FIG. 18, in a preferred embodiment the first structural member 3 is a horizontally-disposed structural member and the first side 4 of the first structural member 3 is a vertical face of the horizontally-disposed structural member, the connector 28 and the strap member 5 are an elongated bent strap, the second structural member 27 is a cementitious member, and a second plurality of fasteners 31 attach the elongated bent strap to the cementitious member.

As best shown in FIG. 19, in a preferred embodiment the first structural member 3 is an angled structural member and the first side 4 of the first structural member 3 is a vertical face of the angled structural member, and the connector 28 and the strap member 5 are an elongated bent strap, the second structural member is a horizontally-disposed structural member, and a second plurality of fasteners 31 attaches the elongated bent strap to the horizontally-disposed structural member.

As best shown in FIG. 20, in a preferred embodiment the first structural member 3 and the second structural member 27 are substantially colinear, the connector and the strap member 5 are an elongated metal strap; and a second strap holder 12 connects the elongated strap to the second structural member 27 in conjunction with a second plurality of fasteners 31.

As best shown in FIG. 21, in a preferred embodiment the first structural member 3 is a header and the first side 4 of the first structural member 3 is a vertical face of the header, the connector 28 is a joist hanger and the strap member 5 is a top flange of the joist hanger, and the second structural member 27 is a horizontal beam.

As best shown in FIG. 26, in a preferred embodiment at least one of the first plurality of fasteners 15 passes through only the strap holder 12 into the second side 17 of the first structural member 3.

As best shown in FIGS. 22, 23, 24, 25 and 26, in a preferred embodiment the strap holder 12 additionally comprises a first junction 29 and a second junction 30, the first junction 29 and the second junction 30 dividing the upper face 13 and the lower face 14 into a first attachment portion 21, a second attachment portion 22, and a first securement portion 23 between the first junction 29 and the second junction 30. The first attachment portion 21 is dimensioned to closely interface with the second side 17 of the first structural member 3, the second attachment portion 22 is dimensioned to closely interface with the third side 26 of the first structural member 3, the first and second attachment portion 22s are substantially parallel to each other and substantially perpendicular to the first securement portion 23.

As best shown in FIG. 26, in a preferred embodiment one or more of the first plurality of fasteners 15 passes through the first attachment portion 21 into the second side 17 of the first structural member 3, one or more of the first plurality of fasteners 15 passes through the second attachment portion 22 into the third side 26 of the first structural member 3, and one of more of the first plurality of fasteners 15 passes through the first securement portion 23, through the strap member 5, and into the first side 4 of the first structural member 3.

As best shown in FIG. 27, in a preferred embodiment the first structural member 3 is a wall stud and the first side 4 of the first structural member 3 is a vertical face of the wall stud, the connector 28 is a strap holdown and the strap member 5 is a strap portion of the strap holdown, and the second structural member 27 is a concrete foundation.

As best shown in FIG. 28, in a preferred embodiment the first structural member 3 is a purlin and the first side 4 of the first structural member 3 is a horizontal top face of the purlin, the connector 28 is a purlin anchor and the strap member 5 is a strap portion of the purlin anchor, and the second structural member 27 is cementitious wall.

As best shown in FIG. 29, in a preferred embodiment the first structural member 3 is a stud and the first side 4 of the first structural member 3 is a vertical face of the stud, the connector 28 and the strap member 5 are an elongated metal strap, the second structural member 27 is a cementitious member, and a second plurality of fasteners 31 attaches the elongated metal strap to the cementitious member.

As best shown in FIG. 30, in a preferred embodiment the first structural member 3 is a post and the first side 4 of the first structural member 3 is a vertical face of the post, the connector 28 and the strap member 5 are an elongated metal strap, the second structural member 27 is a header, and a second plurality of fasteners 31 attach the elongated metal strap to the header.

As best shown in FIG. 31, in a preferred embodiment the first structural member 3 and the second structural member 27 are substantially colinear, the strap member 5 is an elongated metal strap; and a second strap holder 12 connects the elongated strap to the second structural member 27 in conjunction with a second plurality of fasteners 31.

As best shown in FIG. 32, in a preferred embodiment the first structural member 3 and the second structural member 27 are substantially colinear, the strap member 5 is an elongated metal strap, a second strap holder 12 connects the elongated strap to the second structural member 27 in conjunction with a second strap holder 12. The second strap holder 12 additionally comprises a first transition line 19 and a second transition line 20, the first transition line 19 and the second transition line 20 dividing the upper face 13 and the lower face 14 into a first attachment portion 21, a second attachment portion 22, and a first securement portion 23 between the first transition line 19 and the second transition line 20. The first securement portion 23 is dimensioned to closely interface with the upper surface 6 of the strap member 5, the first transition line 19 being closely parallel to the first side edge 8 of the strap and the second transition line 20 being closely parallel to the second side 17 edge 9 of the strap.

What is claimed is:

1. A connection comprising:
    a. a first structural member, having a first side, a second side, and a third side;
    b. a second structural member;
    c. a connector having an elongated strap member, said strap member having an upper surface, a lower surface, a first side edge, a second side edge, and a first end edge;
    d. a strap holder having an upper face and a lower face, said lower face being dimensioned to interface with said first side of said first structural member said strap holder being not attached to said second structural member; and
    e. a first plurality of fasteners; wherein:
        i. said lower surface of said strap member interfaces with said first side of said first structural member;
        ii. said lower face of said strap holder interfaces with said upper surface of said strap member, extending beyond said first side edge of said strap member to interface with said first structural member;
        iii. at least one of said first plurality of fasteners passes first through said strap holder and then through said strap member and then into said first side of said first structural member;
        iv. at least one of said first plurality of fasteners passes through only said strap holder into said first structural member; and
        v. said connector having said strap member connects to said second structural member.

2. The connection of claim 1, wherein at least one of said first plurality of fasteners passes through only said strap holder into said first side of said first structural member.

3. The connection of claim 2, wherein said strap holder additionally comprises a first transition line and a second transition line, said first transition line and said second transition line dividing said upper face and said lower face into a first attachment portion, a second attachment portion, and a first securement portion between said first transition line and said second transition line, and wherein said first securement portion is dimensioned to closely interface with said upper surface of said strap member, said first transition line being closely parallel to said first side edge of said strap and said second transition line being closely parallel to said second side edge of said strap.

4. The connection of claim 3, wherein one or more of said first plurality of fasteners passes through said first attachment portion into said first side of said first structural member, one or more of said first plurality of fasteners passes through said second attachment portion into said first side of said first structural member, and one of more of said first plurality of fasteners passes through said first securement portion, through said strap member, and into said first side of said first structural member.

5. The connection of claim 4, wherein said first structural member is a header and said first side of said first structural member is a vertical face of said header, said connector and said strap member are an elongated metal strap, said second structural member is a vertical wall stud, and a second plurality of fasteners attach said elongated metal strap to said vertical wall stud.

6. The connection of claim 4, wherein said first structural member is a header and said first side of said first structural member is a horizontal top face of said header, said connector is a truss hanger and said strap member is a top flange of said truss hanger, and said second structural member is a horizontal chord of a truss.

7. The connection of claim 4, wherein said first structural member is a header and said first side of said first structural member is a horizontal top face of said header, said connector is a joist hanger and said strap member is a top flange of said joist hanger, and said second structural member is a horizontal beam.

8. The connection of claim 4, wherein said first structural member is truss member and said first side of said first structural member is a vertical face of said truss member, said connector is an embedded truss anchor and said strap member is a strap portion of said embedded truss anchor, and said second structural member is a cementitious member.

9. The connection of claim 4, wherein said first structural member is wall stud and said first side of said first structural member is a vertical face of said wall stud, said connector is a strap holdown and said strap member is a strap portion of said strap holdown, said second structural member is a concrete foundation.

10. The connection of claim 4, wherein said first structural member is a purlin and said first side of said first structural member is a horizontal top face of said purlin, said connector is a purlin anchor and said strap member is a strap portion of said purlin anchor, and said second structural member is cementitious wall.

11. The connection of claim 4, wherein said first structural member is a stud and said first side of said first structural member is a vertical face of said stud, said connector and said strap member are an elongated metal strap, said second structural member is a cementitious member, and a second plurality of fasteners attaches said elongated metal strap to said cementitious member.

12. The connection of claim 4, wherein said first structural member is a horizontally-disposed structural member and said first side of said first structural member is a vertical face of said horizontally-disposed structural member, said connector and said strap member are an elongated bent strap, the second structural member 27 is a cementitious member, and a second plurality of fasteners attach said elongated bent strap to said horizontally-disposed structural member.

13. The connection of claim 4, wherein said first structural member is an angled structural member and said first side of said first structural member is a vertical face of said angled structural member, said connector and said strap member are an elongated bent strap, said second structural member is a horizontally-disposed structural member, and a second plurality of fasteners attaches said elongated bent strap to said cementitious member.

14. The connection of claim 4, wherein:
 a. said first structural member and said second structural member are substantially colinear;
 b. said connector and said strap member are an elongated metal strap; and
 c. a second strap holder connects said elongated strap to said second structural member in conjunction with a second plurality of fasteners.

15. The connection of claim 4, wherein said first structural member is a header and said first side of said first structural member is a vertical face of said header, said connector is a joist hanger and said strap member is a top flange of said joist hanger, and said second structural member is a horizontal beam.

16. The connection of claim 1, wherein at least one of said first plurality of fasteners passes through only said strap holder into said second side of said first structural member.

17. The connection of claim 16, wherein said strap holder additionally comprises a first junction and a second junction, said first junction and said second junction dividing said upper face and said lower face into a first attachment portion, a second attachment portion, and a first securement portion between said first junction and said second junction, and wherein said first attachment portion is dimensioned to closely interface with said second side of said first structural member, said second attachment portion is dimensioned to closely interface with said third side of said first structural member, said first and second attachment portions are substantially parallel to each other and substantially perpendicular to said first securement portion.

18. The connection of claim 17, wherein one or more of said first plurality of fasteners passes through said first attachment portion into said second side of said first structural member, one or more of said first plurality of fasteners passes through said second attachment portion into said third side of said first structural member, and one of more of said first plurality of fasteners passes through said first securement portion, through said strap member, and into said first side of said first structural member.

19. The connection of claim 18, wherein said first structural member is a wall stud and said first side of said first structural member is a vertical face of said wall stud, said connector is a strap holdown and said strap member is a strap portion of said strap holdown, said second structural member is a concrete foundation.

20. The connection of claim 18, wherein said first structural member is a purlin and said first side of said first structural member is a horizontal top face of said purlin, said connector is a purlin anchor and said strap member is a strap portion of said purlin anchor, and said second structural member is cementitious wall.

21. The connection of claim 18, wherein said first structural member is a stud and said first side of said first structural member is a vertical face of said stud, said connector and said strap member are an elongated metal strap, said second structural member is a cementitious member, and a second plurality of fasteners attaches said elongated metal strap to said cementitious member.

22. The connection of claim 18, wherein said first structural member is a post and said first side of said first structural member is a vertical face of said post, said connector and said strap member are an elongated metal strap, said second structural member is a header, and a second plurality of fasteners attach said elongated metal strap to said header.

23. The connection of claim 18, wherein:
 a. said first structural member and said second structural member are substantially colinear;
 b. said connector and said strap member are an elongated metal strap; and
 c. a second strap holder connects said elongated strap to said second structural member in conjunction with a second plurality of fasteners.

24. The connection of claim 18, wherein:
 a. said first structural member and said second structural member are substantially colinear;
 b. said connector and said strap member are an elongated metal strap;
 c. a second strap holder connects said elongated strap to said second structural member in conjunction with a second strap holder, and:
  i. said second strap holder additionally comprises a first transition line and a second transition line, said first transition line and said second transition line dividing said upper face and said lower face into a first attachment portion, a second attachment portion, and a first securement portion between said first transition line and said second transition line, and wherein said first securement portion is dimensioned to closely interface with said upper surface of said strap member, said first transition line being closely parallel to said first side edge of said strap and said second transition line being closely parallel to said second side edge of said strap.

* * * * *